(12) United States Patent
Brickey et al.

(10) Patent No.: US 12,709,076 B2
(45) Date of Patent: Aug. 18, 2026

(54) INTEGRATED CAUL WITH ELASTOMERIC SEALS

(71) Applicant: The Boeing Company, Arlington, VA (US)

(72) Inventors: Samuel Shane Brickey, Bellingham, WA (US); Julia Karolina Slusarski, Seattle, WA (US)

(73) Assignee: The Boeing Company, Arlington, VA (US)

(*) Notice: Subject to any disclaimer, the term of this patent is extended or adjusted under 35 U.S.C. 154(b) by 137 days.

(21) Appl. No.: 18/640,299

(22) Filed: Apr. 19, 2024

(65) Prior Publication Data

US 2024/0262055 A1 Aug. 8, 2024

Related U.S. Application Data

(62) Division of application No. 17/661,894, filed on May 3, 2022, now Pat. No. 11,993,034.

(51) Int. Cl.
*B29C 70/54* (2006.01)
*B29C 70/44* (2006.01)

(52) U.S. Cl.
CPC ............ *B29C 70/549* (2021.05); *B29C 70/44* (2013.01)

(58) Field of Classification Search
CPC .......................... B29C 66/114; B29C 66/1142
See application file for complete search history.

(56) References Cited

U.S. PATENT DOCUMENTS

| | | | |
|---|---|---|---|
| 5,439,635 | A | 8/1995 | Seemann |
| 5,807,593 | A | 9/1998 | Thompson |
| 2008/0308960 | A1 | 12/2008 | Rydin et al. |

FOREIGN PATENT DOCUMENTS

| | | | |
|---|---|---|---|
| EP | 2939819 | A1 | 11/2015 |
| WO | 2008144035 | A1 | 11/2008 |

OTHER PUBLICATIONS

Corrected Notice of Allowance, dated Mar. 7, 2024, regarding U.S. Appl. No. 17/661,894, 8 pages.
European Patent Office Extended Search Report, dated Oct. 11, 2023, regarding Application No. EP23158040.8, 7 pages.
Notice of Allowance, dated Feb. 14, 2024, regarding U.S. Appl. No. 17/661,894, 11 pages.
Office Action, dated Dec. 26, 2023, regarding U.S. Appl. No. 17/661,894, 15 pages.

*Primary Examiner* — Christopher T Schatz
(74) *Attorney, Agent, or Firm* — Yee & Associates, P.C.

(57) ABSTRACT

A method, apparatus, and system for applying a vacuum-based pressure on an uncured composite structure. Membranes are bonded to a boundary of a caul. The membranes include positive features that define vacuum channels. The membranes are spliced to each other. The positive features that define the vacuum channels in the membranes are aligned to each other during splicing of the membranes. The membranes spliced to each other and bonded to the caul to form an integrated caul. The integrated caul applies a pressure on the uncured composite structure during operation of the integrated caul.

20 Claims, 17 Drawing Sheets

INTEGRATED CAUL WITH ELASTOMERIC SEALS

CROSS-REFERENCE TO RELATED APPLICATION

This application is a Divisional Application of U.S. patent application Ser. No. 17/661,894, filed May 3, 2022, issued as U.S. Pat. No. 11,993,034 dated May 28, 2024, which is herein incorporated by reference in its entirety.

BACKGROUND INFORMATION

1. Field

The present disclosure relates generally to manufacturing composite structures and in particular, to a method, apparatus, and system for manufacturing a composite structure using an integrated caul to apply a vacuum-based pressure.

2. Background

Aircraft are being designed and manufactured with greater and greater percentages of composite materials. Composite materials are used in aircraft to decrease the weight of the aircraft. This decreased weight improves performance features such as payload capacity and fuel efficiency. Further, composite materials provide longer service life for various components in an aircraft.

Composite materials are tough, light-weight materials created by combining two or more functional components such as reinforcing fibers bound in a polymer resin matrix. The fibers may be unidirectional or may take the form of a woven cloth or fabric. The fibers and resins may be arranged and cured to form a composite structure.

Using composite materials to create aerospace composite structures can allow for portions of an aircraft to be manufactured in larger pieces or sections. For example, a fuselage in an aircraft can be created in cylindrical, half, or quarter sections that are assembled to form the fuselage of the aircraft. Other examples include, without limitation, wing sections joined to form a wing or stabilizer sections joined to form a stabilizer.

In manufacturing composite structures, layers of composite material can be laid up on a tool. The layers of composite material may be comprised of fibers in sheets. These sheets may take the form of, for example, fabrics, tape, tows, or other suitable configurations for the sheets. In some cases, a resin may be infused or pre-impregnated into the sheets. These types of sheets are commonly referred to as prepreg.

The different layers of prepreg can be laid up in different orientations and different numbers of layers can be used depending on the desired thickness of the composite structure being manufactured.

The layup of different layers forms an uncured composite structure. These layers can be consolidated and cured upon exposure to temperature and pressure, thus forming the final composite structure. The consolidation and curing can be performed using tools such as elastomeric bag and caul systems. These systems use disposable bagging materials covering a caul. The disposable bagging materials are secured using a sealant tape. Other components including an edge breather, release film, and flash breaker tape are also used in these systems.

Current elastomeric bag and caul systems provide desired results but are often more time consuming to setup and expensive than desired. Therefore, it would be desirable to have a method and apparatus that take into account at least some of the issues discussed above, as well as other possible issues. For example, it would be desirable to have a method and apparatus that overcome a technical problem with the set-up time and expense of current elastomeric bag and caul systems.

SUMMARY

An embodiment of the present disclosure provides a vacuum pressure system including a caul and membranes located on a boundary of the caul. The membranes are connected to the caul and have positive features defining vacuum channels. The caul and the membranes connected to the boundary of the caul form an integrated caul.

Another embodiment of the present disclosure provides a tooling system for applying vacuum based pressure on uncured composite structures. The tooling system includes a caul and membranes connected to a boundary of the caul. Positive features are formed in the membranes. The membranes are aligned to each other such that the positive features are aligned. The positive features form vacuum channels in the membranes. A set of ports in the membranes are in communication with the vacuum channels. A vacuum source is connected to the set of ports.

Still another embodiment of the present disclosure provides a vacuum pressure system including a control system. The control system operates to place an integrated caul on an uncured composite structure. The integrated caul comprises membranes bonded to a caul in which the membranes include positive features that define vacuum channels and a filler in gaps between the membranes in which the filler has the positive features that form part of the vacuum channels that are continuous around a boundary of the caul. The control system operates to draw a vacuum in the vacuum channels such that the integrated caul applies a pressure on the uncured composite structure. The control system operates to cure the uncured composite structure while applying the pressure on the uncured composite structure using the integrated caul to form a composite structure.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
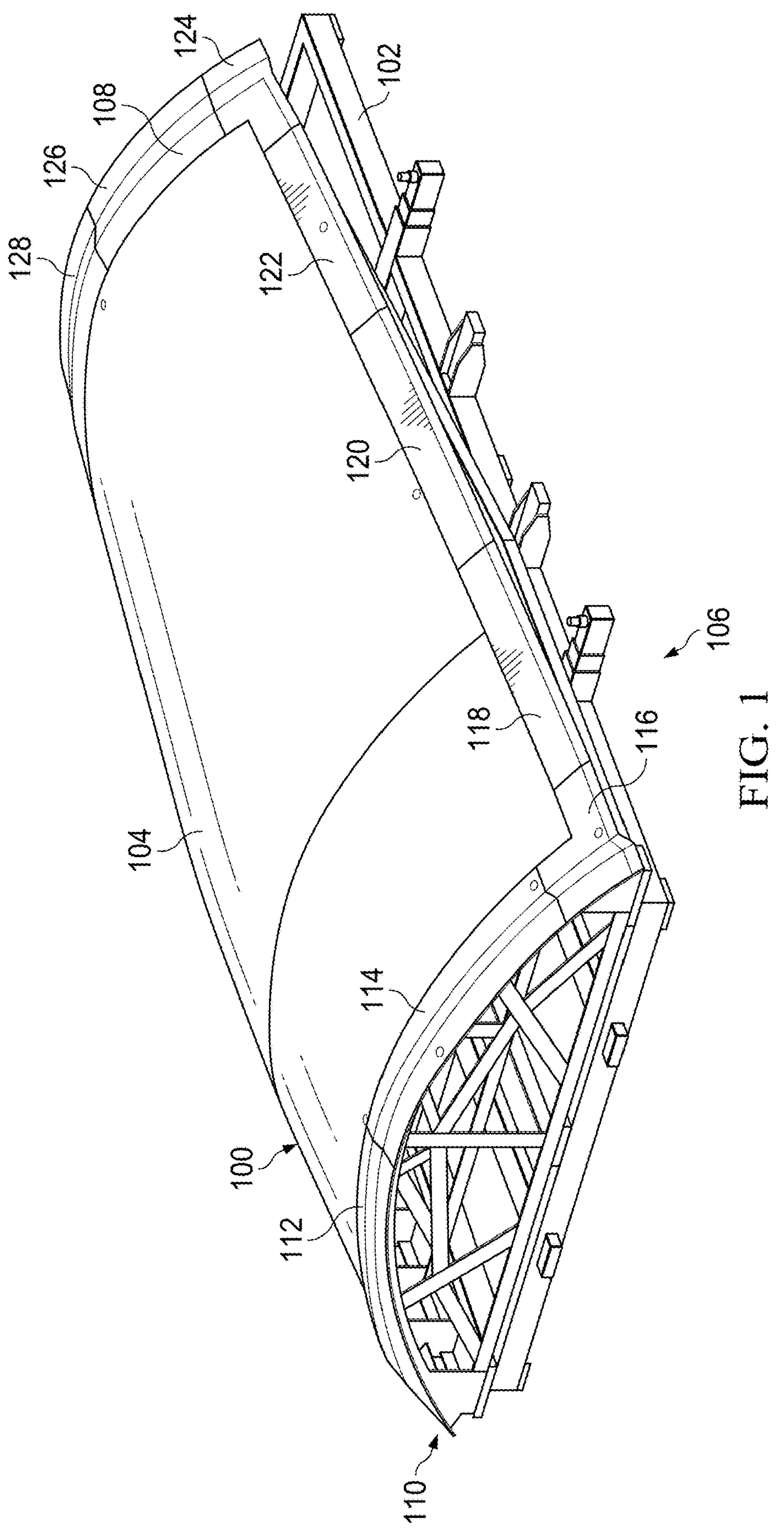
FIG. 1 is a pictorial illustration of an integrated caul system placed on an uncured fuselage section laid up on a tool in accordance with an illustrative embodiment.

The illustrative embodiments recognize and take into account one or more different considerations as described below. For example, the illustrative embodiments recognize and take into account that current bag and caul systems can take much more time than desired to set up for curing composite parts. Example, with a section of the fuselage, the setup of the caul and elastomeric bag can take many hours. The elastomeric bag functions as a vacuum bag. Typically, a caul is applied with a consumable seal to the mandrel with the uncured composite structure laid up on the mandrel. This layup of the caul is followed by elastomeric bag and other components such as a release film, sealant tape, edge breathers, and other components. These components are used to draw a vacuum for consolidation and curing and can take 16 or more hours to put in place. The elastomeric bag, release film, sealant tape, edge breathers, and other components removed and discarded after curing.

As result, these components are consumables which are not reusable, increasing the cost. Thus, when another uncured composite structure is to be consolidated and cured, the caul is used with another elastomeric bag, and other components.

It is desirable to have a tooling system in which consolidation and curing of composite materials can be performed in less time. It is also desirable to reduce the number of components needed such as sealant tape, and elastomeric bag, release film, edge breather, and other components that may be considered to be consumables. As used herein, a "number of" when used with reference to items means one or more items. For example, a number of components is one or more components.

Thus, illustrative examples take into account one or more of the considerations discussed above as well as other considerations and provide a method, apparatus, and system for applying a vacuum-based pressure on uncured composite structure. This vacuum-based pressure can be used to perform consolidation and curing of the uncured composite structure. In the illustrative examples, an integrated caul is used in place of an elastomeric bag and caul system. The integrated caul comprises a caul and membranes. These membranes can be segments of elastomeric material around the boundary of the caul. These membranes are spliced together to form the integrated caul. The splicing can be performed using a filler that can be an uncured elastomer that joins the ends of a pair of membranes to each other. In these illustrative examples, the membrane includes channels that function as vacuum channels. When spliced using the filler, a continuous channel can be present around the boundary of the caul through which a vacuum can be drawn.

The integrated caul can be placed on a tool with an uncured composite structure in less time as compared to current elastomeric bag and caul systems. The use of an elastomeric bag is unnecessary. Further, the use of other components such as at least one of sealant tape, release film, edge breathers, or other components are unnecessary or can be reduced. This integrated caul is reusable for use in curing other uncured composite structures without needing another elastomeric bag with a consumable seal.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

With reference now to the figures in particular with reference to FIG. 1, a pictorial illustration of an integrated caul system placed on an uncured fuselage section laid up on a tool is depicted in accordance with an illustrative embodiment. In this illustrative example, integrated caul 100 is placed on an uncured fuselage section (not shown) laid up on tool 102.

Integrated caul 100 comprises caul 104 and membranes 106. In this example, membranes 106 are attached to boundary 108 of caul 104. As seen in this view, membranes 106 comprises corner membrane 110, end membrane 112, end membrane 114, corner membrane 116, side membrane 118, side membrane 120, side membrane 122, corner membrane 124, end membrane 126, and end membrane 128. In this example, another corner membrane and two side membranes are also part of membranes 106 but not seen in this view.

As depicted, integrated caul 100 can be placed on the uncured composite structure laid up on tool 102 without performing operations such as placing nylon bag, sealant tape, release film, edge breathers, or other consumable components. As result, the amount of time is reduced as compared to current systems. Further, removal of these components is unnecessary since they are not used as part of integrated caul 100 for placement for curing the uncured composite structure. Additionally, the removal of integrated caul 100 is less complicated and takes less time as compared to current elastomeric bag and caul systems.

Moreover, integrated caul 100 is reusable without needing consumable components to cure another uncured composite structure. Additionally, where damage occurs to a membrane in membranes 106, that membrane can be replaced, and the replacement membrane can be re-spliced with the other membranes and membranes 106.

Figure 2:
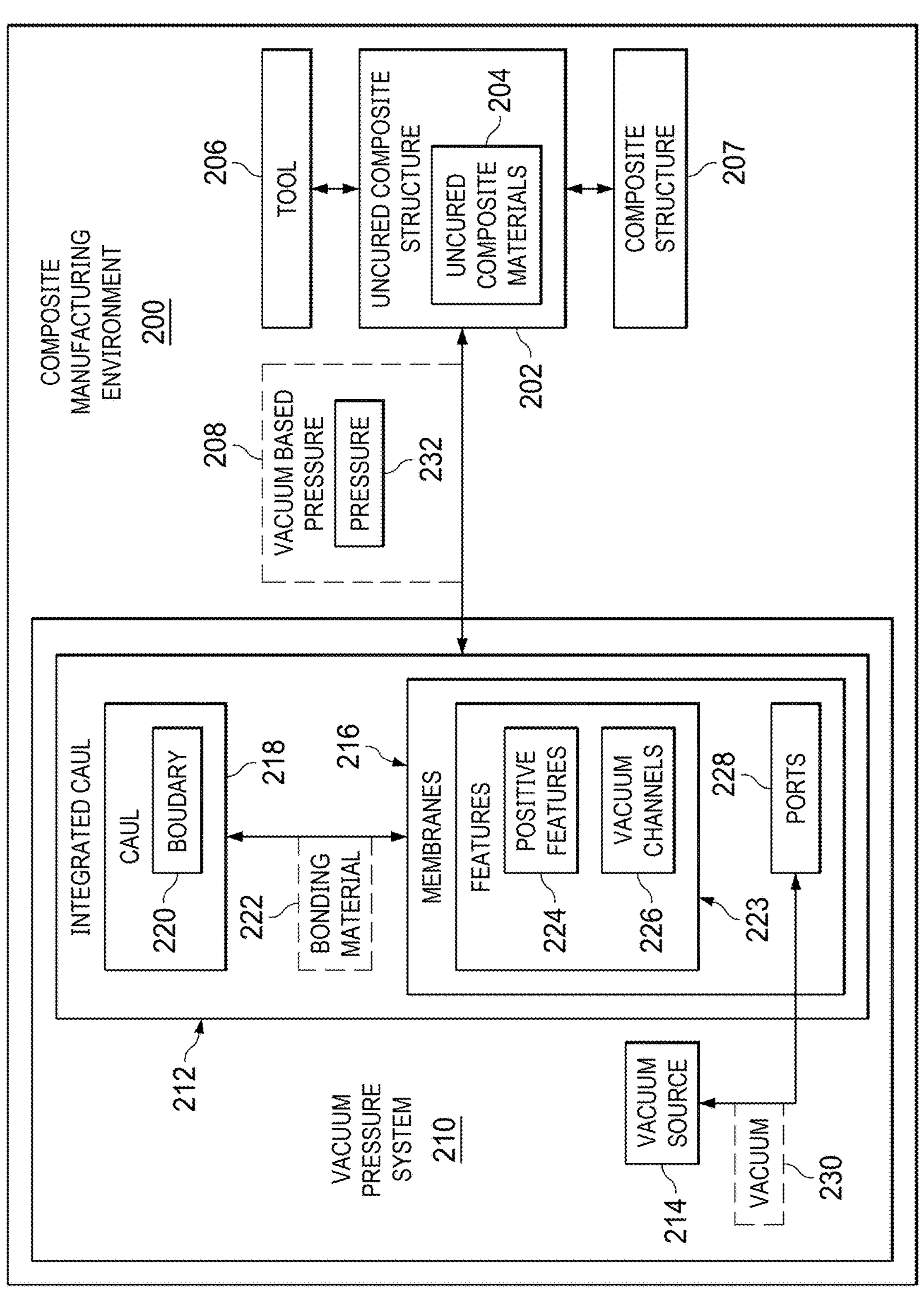
FIG. 2 is an illustration of a block diagram of a composite manufacturing environment in accordance with an illustrative embodiment.

Turning next to FIG. 2, an illustration of a block diagram of a composite manufacturing environment is depicted in accordance with an illustrative embodiment. In this illustrative example, integrated caul 100 in FIG. 1 is an example of a tool that can be used in composite manufacturing environment 200.

As depicted, uncured composite structure 202 is comprised of uncured composite materials 204 laid up on tool 206. In this illustrative example, uncured composite structure 202 can take a number of different forms. For example, uncured composite structure 202 can be selected from one of a full barrel fuselage section, half barrel fuselage section, quarter fuselage section, a skin panel, a door, a stringer, a stabilizer section, a fairing, or other suitable structure.

In this illustrative example, uncured composite materials 204 can take a number of different forms. For example, uncured composite materials 204 can be selected from at least one of fibers in a sheet, a fabric, a tape, a tow, a prepreg, or other suitable material. In this example, resin can be infused or pre-impregnated and is referred to as a prepreg.

In this illustrative example, uncured composite structure 202 laid up on tool 206 can be cured to form composite structure 207. The process of curing uncured composite structure 202 can involve applying vacuum based pressure 208 on uncured composite structure 202. The application of vacuum based pressure 208 can occur during at least one of consolidation or curing of uncured composite structure 202.

As depicted, vacuum based pressure 208 can be applied to uncured composite structure 202 using vacuum pressure system 210. In this illustrative example, vacuum pressure system 210 comprises integrated caul 212 and vacuum source 214. Integrated caul 100 in FIG. 1 is an example of one implementation for integrated caul 212.

Integrated caul 212 can be placed on uncured composite structure 202 laid up on tool 206. In this illustrative example, integrated caul 212 comprises membranes 216 and caul 218. In this illustrative example, membranes 216 are located on boundary 220 of caul 218.

In this illustrative example, membranes 216 are comprised of at least one of silicon, a synthetic rubber and fluoropolymer elastomer, a fluoroelastomer, or other suitable material. In one example, a membrane can be comprised of more than one material. For example, membrane can be comprised of a silicon layer and a fluoroelastomer layer. For example, the fluoroelastomer layer can be used with a silicon layer to reduce diffusion of nitrogen. Further, this layer can be selected for compatibility with chromate or sealant tape.

Membranes 216 can be connected to caul 218 by bonding material 222. Bonding material 222 can be selected from at least one of an adhesive, a glue, a resin, or other suitable material that can create a bond between membranes 216 and caul 218.

Membranes 216 can be bonded to caul 218 prior to splicing membranes 216 to each other. In another implementation, membranes 216 can be bonded to caul 218 after to splicing membranes 216 to each other.

In this illustrative example, membranes 216 have features 223 that include positive features 224. Positive features 224 are features that can define other features in feature 223 such as vacuum channels 226. In this illustrative example, membranes 216 can be spliced together such that that vacuum channels 226 are continuous through membranes 216.

In the illustrative example, vacuum channels 226 for membranes 216 means that each membrane in membranes 216 can have a set of vacuum channels 226. For example, a membrane can have one vacuum channel or to two channels depending on the particular implementation. Each vacuum channel or back to channels in a membrane are collectively referred to as vacuum channels 226.

A set of ports 228 are also present in membranes 216. In this illustrative example, the set of ports 228 can be connected to vacuum source 214.

As used herein, a "set of" when used with reference items means one or more items. For example, a set of ports 228 is one or more ports.

In this example, the set of ports 228 can be a single port or multiple ports in membranes 216. A port is not required in every membrane in membranes 216.

With this connection, vacuum source 214 can draw vacuum 230 to cause integrated caul 212 to apply pressure 232. Pressure 232 is applied on uncured composite structure 202 on which integrated caul is placed during the curing process to cure uncured composite structure 202 to form composite structure 207. In this example, pressure 232 is vacuum based pressure 208.

Figure 3:
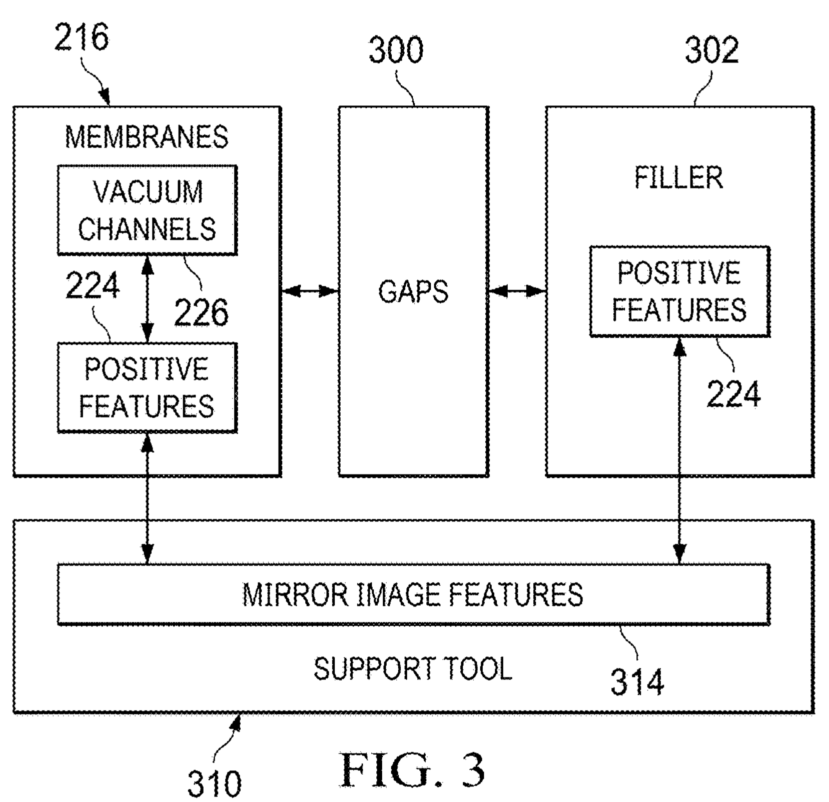
FIG. 3 is an illustration of a block diagram for splicing membranes in accordance with an illustrative embodiment.

Turning next to FIG. 3, an illustration of a block diagram for splicing membranes is depicted in accordance with an illustrative embodiment. In the illustrative examples, the same reference numeral may be used in more than one figure. This reuse of a reference numeral in different figures represents the same element in the different figures.

As depicted, membranes 216 can be aligned such that positive features 224 that define vacuum channels 226 are aligned to each other. In this example, gaps 300 are present between membranes 216 aligned to each other.

In the illustrative example, filler 302 is added between gaps 300 to join membranes 216 aligned to each other. In this illustrative example, filler 302 comprises positive features 224 and connects vacuum channels 226 in membranes 216 to each other. Filler 302 can be a material that is cured in gaps 300 in a shape that has positive features 224. In the illustrative examples, the width of gaps can be selected based on the particular filler used. The selection of the gap can be based on enabling the filler to be pushed into the gap to provide a seal and form corresponding features to the membranes. A gap can be, for example, 0.30 to 0.40 inches wide.

In this illustrative example, filler 302 can take a number of different forms. For example, filler 302 can be selected from at least one of a silicon, a room temperature vulcanizing silicon, a rubber polymer, a siloxane polymer, a polyurethane, or some other suitable material.

For example, a pair of membranes 216 can have ends that are aligned to each other such that positive features 224 that define vacuum channels 226 in the pair of membranes 216 are aligned to each other. The connection of vacuum channels 226 to each other can form one or more continuous vacuum channels 226 through membranes 216.

In this illustrative example, filler 302 can be added between gaps 300 to join membranes 216 aligned to each other. In this illustrative example, filler 302 comprises positive features 224 and connects vacuum channels 226 in membranes 216 to each other. As result, vacuum channels 226 can be continuous.

This alignment can be made using support tool 310. In this example, support tool 310 has mirror image features 314. These mirror image features are a mirror image of features 223, including positive features 224 in feature 223. For example, a pair of membranes 216 can be aligned with each other such that positive features 224 that define vacuum channels 226 in the pair of membranes 216 are aligned to each other using support tool 310. Support tool 310 has mirror image features 314 that hold and align features 223 including positive features 224 between the pair of membranes 216.

Filler 302 can be added between a gap between the pair of membranes 216 held by support tool 310. In this example, filler 302 has features 223 when cured on support tool 310 with mirror image features 314. Thus, filler 302 has features 223, including positive features 224 that define other features such as vacuum channels 226 in filler 302.

Thus, vacuum pressure system 210 can apply pressure 232 to uncured composite materials 204 in uncured composite structure 202 during the manufacturing of composite structure 207. This pressure can be applied to consolidate uncured composite materials 204 in uncured composite structure 202. Further, pressure 232 can be applied during the curing of uncured composite materials 204 in uncured composite structure 202 to form composite structure 207.

With the use of integrated caul 212, less time is needed to set up vacuum pressure system 210 for curing of uncured composite structure 202 as compared to current elastomeric bag and caul systems. Further, with the use of integrated caul 212, the use of consumable items is reduced. For example, the use of a nylon bag, release film, sealant tape, edge breathers, and other consumable components can be reduced will become unnecessary. As result, the amount of time and expense needed to manufacture composite structures and the expense can be reduced.

Figure 4:
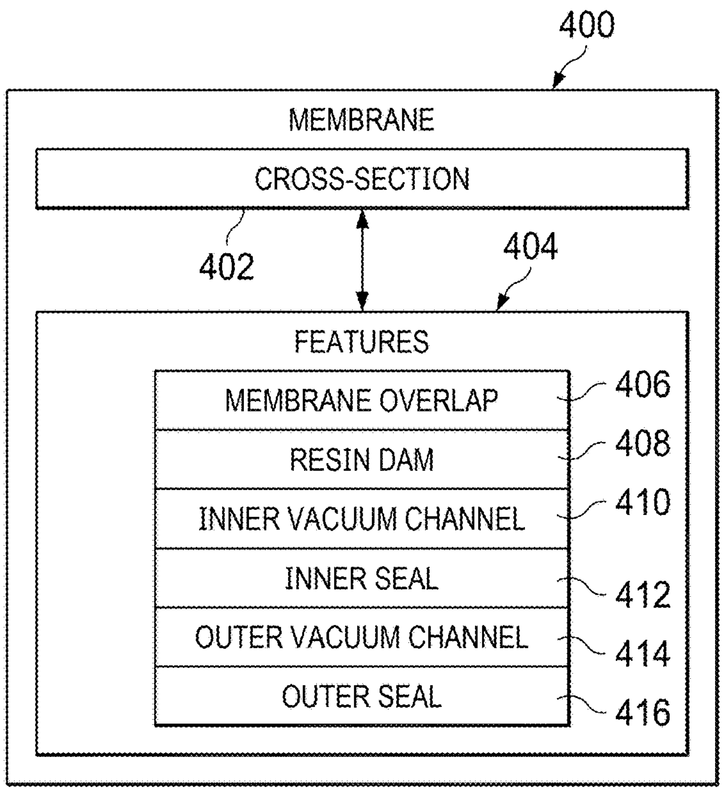
FIG. 4 is an illustration of a block diagram of features in a membrane in accordance with an illustrative embodiment.

Turning to FIG. 4, an illustration of a block diagram of features in a membrane is depicted in accordance with an illustrative embodiment. In this illustrative example, membrane 400 is an example of a membrane in membranes 216. Membrane 400 can have a cross-section 402 with features 404. Features 404 are examples of features 223 in FIG. 2. In this illustrative example, features 404 comprises membrane overlap 406, resin dam 408, inner vacuum channel 410, inner seal 412, outer vacuum channel 414, and outer seal 416.

As depicted, resin dam 408, inner seal 412, and outer seal 416 are positive features in features 404. Inner seal 412 and outer seal 416 define a width of outer vacuum channel 414.

In this example, resin dam 408 can function as a seal with inner seal 412 to define a width of inner vacuum channel 410. Resin dam 408 can also reduce or prevent the flow of resin from uncured composite materials 204 into inner vacuum channel 410 or other features in features 404 for membrane 400 during the curing of uncured composite materials 204.

The illustration of composite manufacturing environment 200 in FIG. 2-4 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, membranes 216 are not required to be continuous all the way around boundary 220. In another illustrative example, integrated caul 212 can be placed on uncured composite structure 202 with adhesive or some other compound that connects integrated caul 212 to uncured composite structure 202 for curing of uncured composite structure 202. In another illustrative example, one or more vacuum sources can be present within vacuum pressure system 210 in addition to vacuum source 214. These vacuum sources can be connected to integrated caul 212 to draw a desired level of vacuum.

Figure 5:
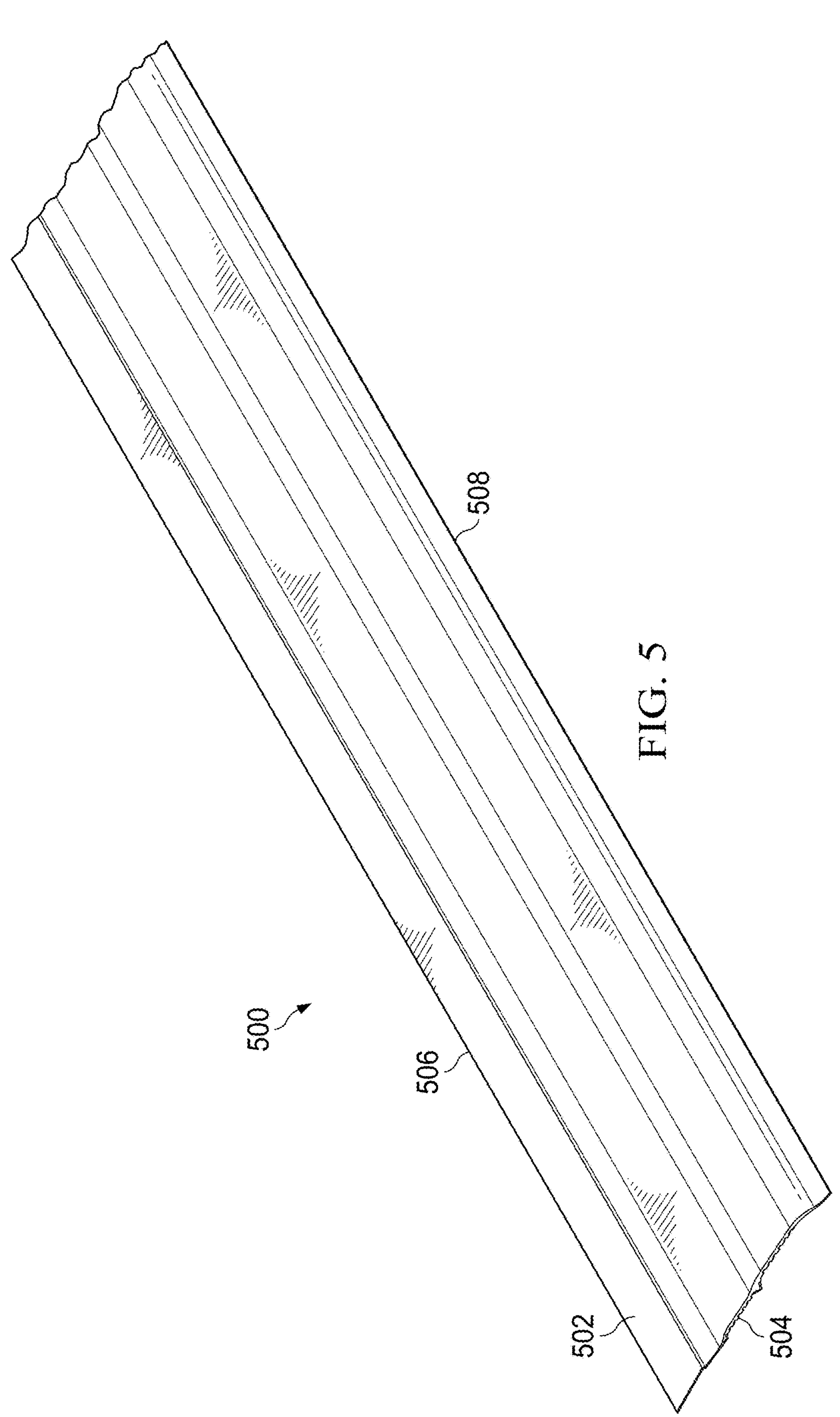
FIG. 5 is an illustration of an isometric top view of a membrane in accordance with an illustrative embodiment.

Turning now to FIG. 5, an illustration of an isometric top view of a membrane is depicted in accordance with an illustrative embodiment. As depicted, membrane 500 is an example of an implementation for a membrane in membranes 106 in FIG. 1 and membranes 216 in FIG. 2.

As depicted, membrane 500 has features such as outer surface 502, inner surface 504, inner edge 506, and outer edge 508. In this illustrative example, inner surface 504 of inner edge 506 can be connected to a caul when forming an integrated caul. Membrane 500 can have different dimensions depending on the particular implementation. For example, membrane 500 can be 60 inches in length and have a width of 8.5 inches in one implementation.

Figure 6:
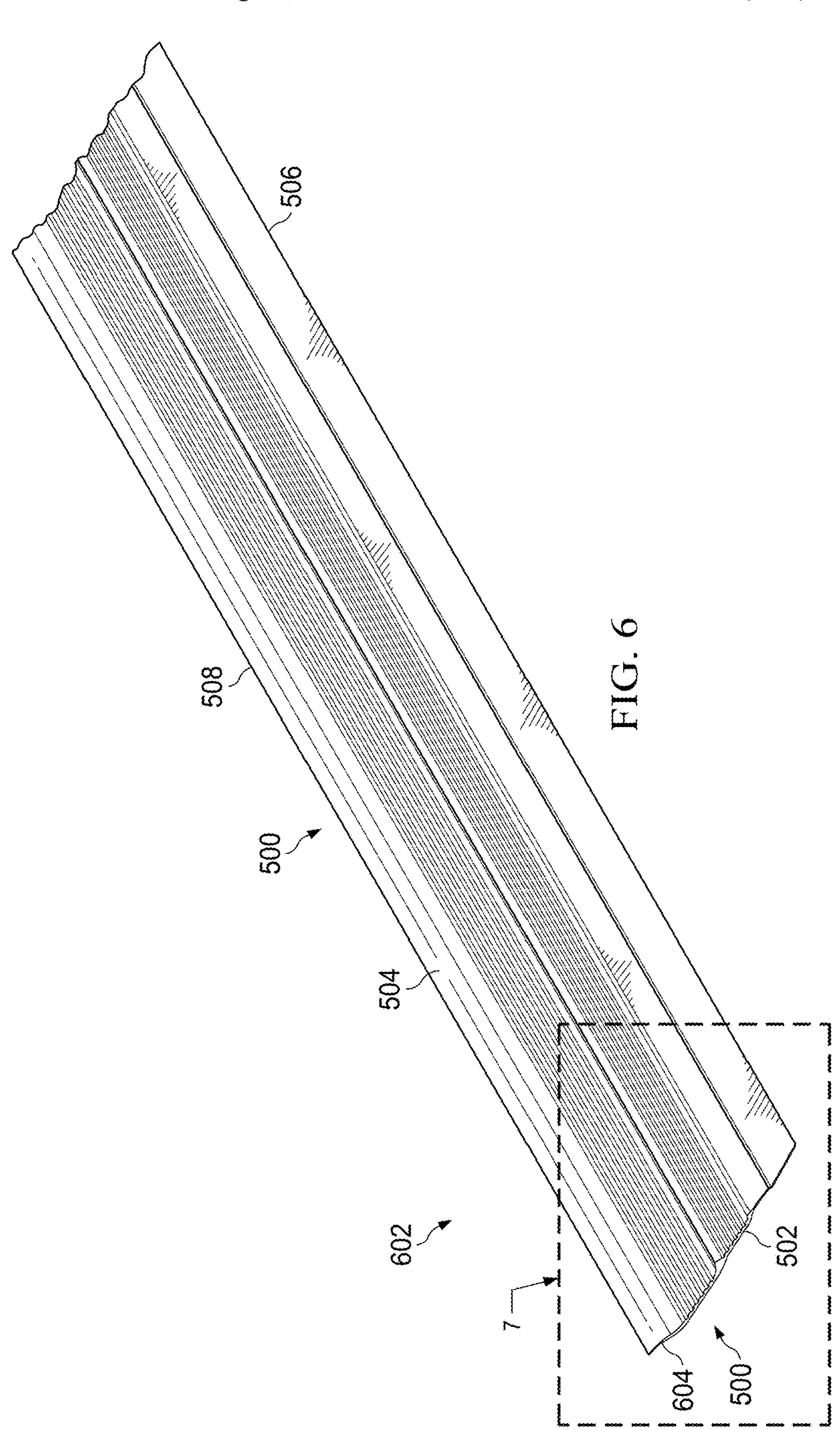
FIG. 6 is an illustration of an isometric bottom view of a membrane in accordance with an illustrative embodiment.

Next in FIG. 6, an illustration of an isometric bottom view of a membrane is depicted in accordance with an illustrative embodiment. As depicted in this view of membrane 500, features including positive features can be seen section 602 on inner surface 504 at end 604 of membrane 500.

Figure 7:
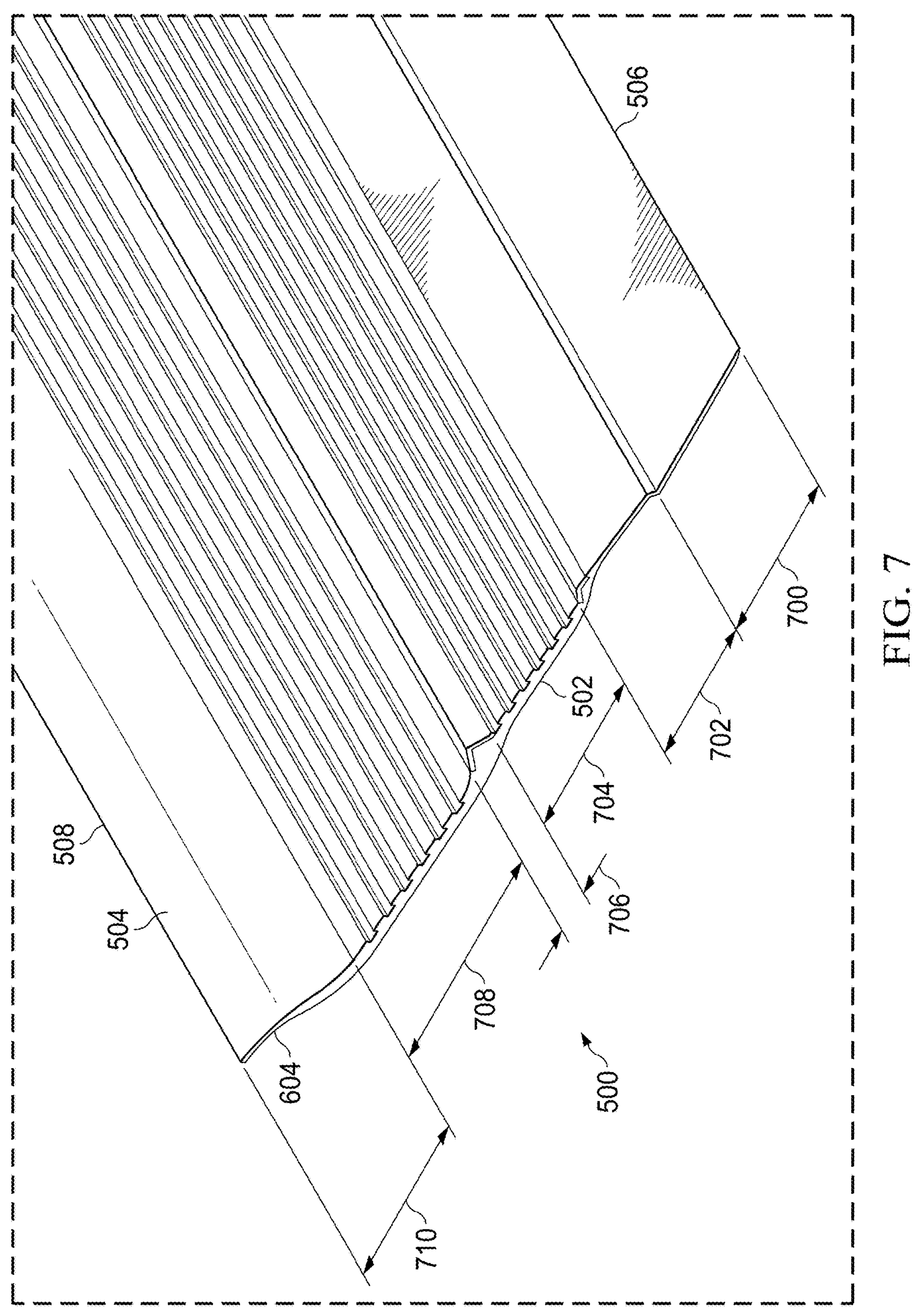
FIG. 7 is a more detailed illustration of positive features in accordance with an illustrative embodiment.

Turning to FIG. 7, a more detailed illustration of positive features is depicted in accordance with an illustrative embodiment. In this figure, a more detailed view of section 602 in FIG. 6 is shown. As depicted, features such as membrane overlap 700, resin dam 702, inner vacuum channel 704, inner seal 706, outer vacuum channel 708, and outer seal 710 are shown.

In this illustrative example, the positive features comprise resin dam 702, inner seal 706, and outer seal 710. Resin dam 702 and inner seal 706 are features that define a feature in the form of inner vacuum channel 704. Inner seal 706 and outer seal 710 define another feature in the form of outer vacuum channel 708.

Membrane overlap 700 is a feature of membrane 500 that can be bonded to a boundary of a caul. Resin dam 702 performs additional functions in addition to being a seal for defining inner vacuum channel 704. Resin dam 702 can also function to reduce or prevent resin in the uncured composite structure from flowing into inner vacuum channel 704 for outer vacuum channel 708.

Figure 8:
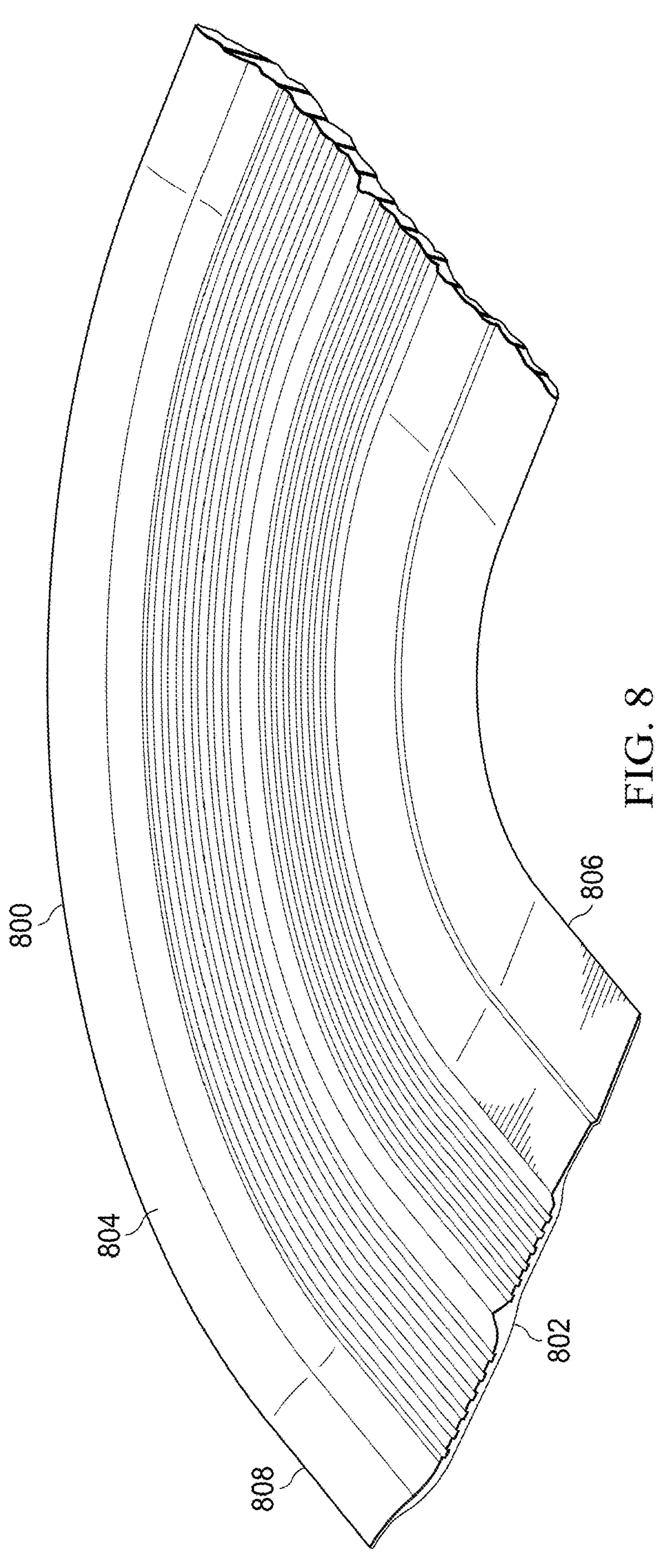
FIG. 8 is an illustration of an isometric bottom view of a curved membrane in accordance with an illustrative embodiment.

Turning next to FIG. 8, an illustration of an isometric bottom view of a curved membrane is depicted in accordance with an illustrative embodiment. In this illustrative example, curved membrane 800 is an example of an implementation for a membrane in membranes 216. This curved membrane can be used to implement corner membrane 110, corner membrane 116, and corner membrane 124 in FIG. 1.

In this bottom view, curved membrane 800 has outer surface 802 and inner surface 804. As depicted, curved membrane 800 has inner edge 806 and outer edge 808. Inner surface 804 of inner edge 806 can be bonded to a caul with other membranes as part of forming an integrated caul.

Figure 9:
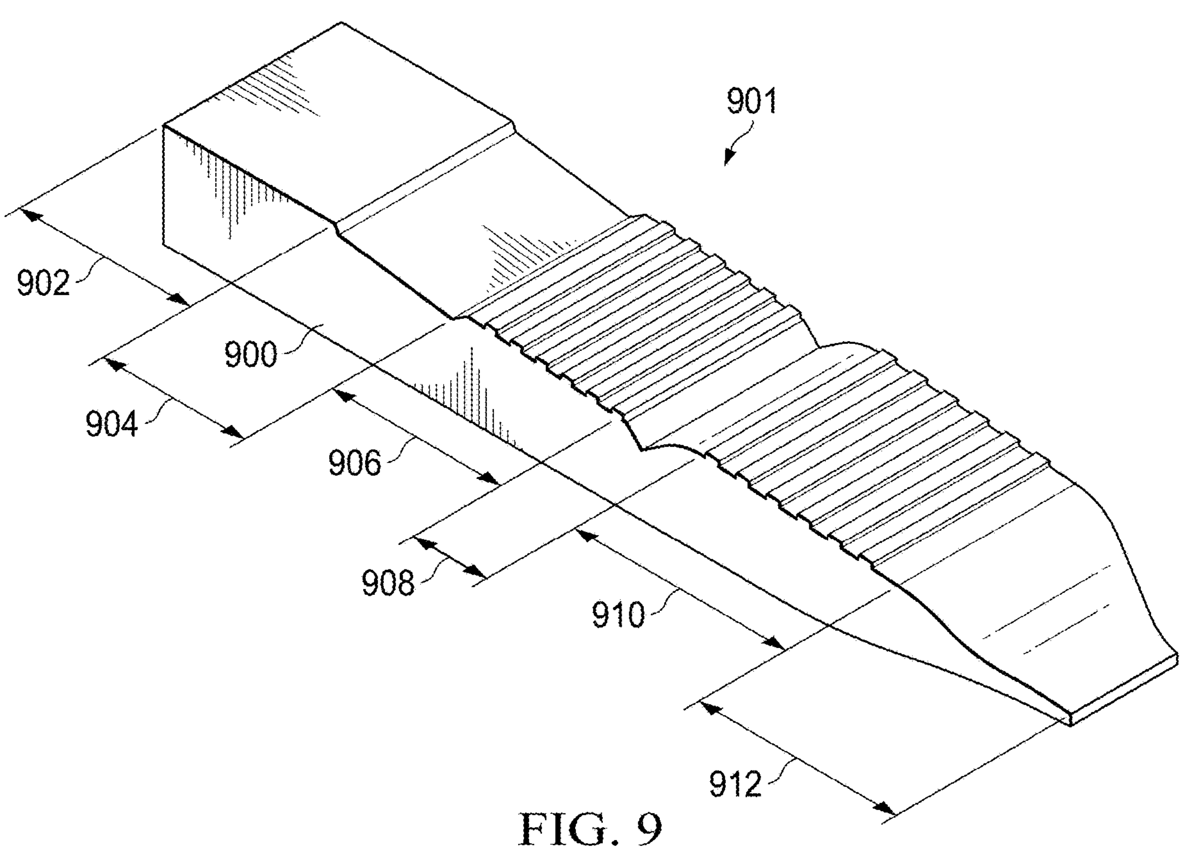
FIG. 9 is an illustration of an isometric view of a support tool in accordance with an illustrative embodiment.

Turning next to FIG. 9, an illustration of an isometric view of a support tool is depicted in accordance with an illustrative embodiment. In this illustrative example, support tool 900 is an example of an implementation for support tool 310 in FIG. 3. As depicted, support tool 900 has mirror image features 901 to the features for membranes such as those show in FIG. 7. In this example, the mirror image features 901 comprise membrane overlap 902, resin dam 904, inner vacuum channel 906, inner seal 908, outer vacuum channel 910, and outer seal 912.

These mirror image features are a mirror image for corresponding features in a membrane such as a membrane overlap, a resin dam, an inner vacuum channel, an inner seal, an outer vacuum channel, and an outer seal. As a result, these mirror image features can hold features in a membrane to align the membrane with another membrane also placed on support tool 900.

Figure 10:
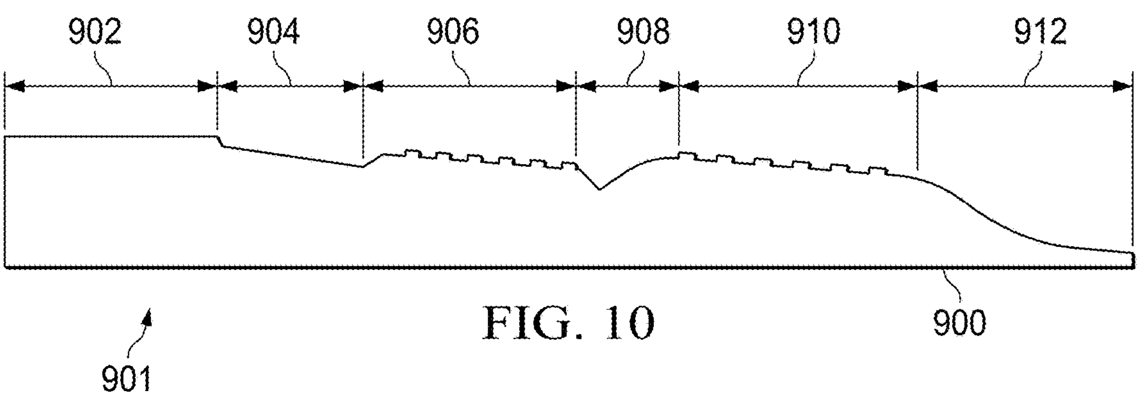
FIG. 10 is an illustration of a side view of the support tool in accordance with an illustrative embodiment.

Turning next to FIG. 10, an illustration of a side view of the support tool is depicted in accordance with an illustrative embodiment. In this side view of support tool 900, features such as membrane overlap 902, resin dam 904, inner vacuum channel 906, inner seal 908, outer vacuum channel 910, and outer seal 912 are mirror image of features in corresponding features for the membranes that are placed onto support tool 900.

Figure 11:
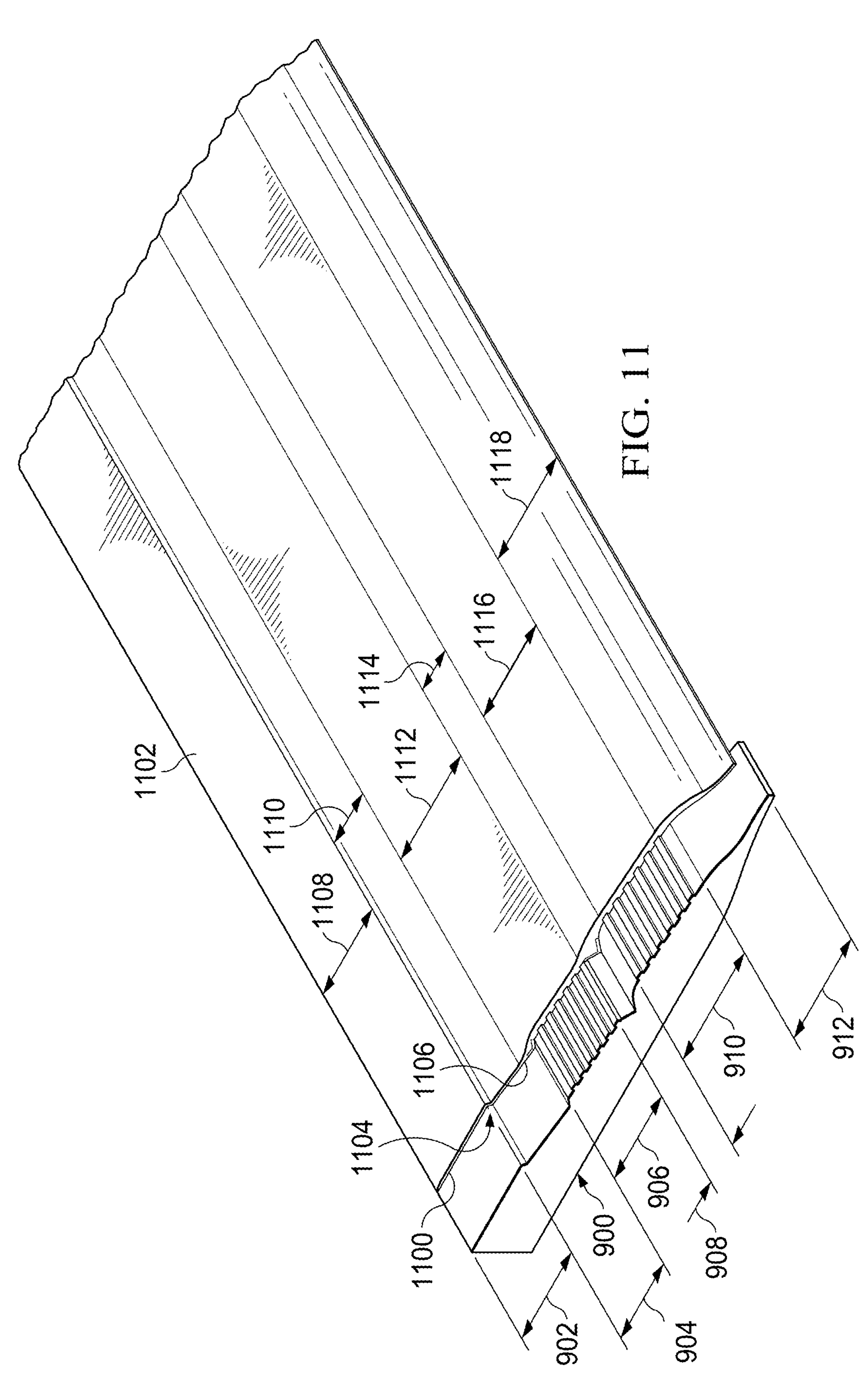
FIG. 11 is an illustration of a support tool located under a membrane in accordance with an illustrative embodiment.

With reference to FIG. 11, an illustration of a support tool located under a membrane is depicted in accordance with an illustrative embodiment. In this illustrative example, end 1100 of membrane 1102 is located on support tool 900. In this illustrative example, membrane 1102 is an example of an implementation for a membrane in membranes 216 in FIG. 2.

End 1100 of membrane 1102 is held in place by mirror image features 901 on support tool 900. As depicted, membrane 1102 has features 1104 on inner surface 1106 that are a mirror image to mirror image features 901 on support tool 900.

For example, features 1104 for membrane 1102 comprises membrane overlap 1108, resin dam 1110, inner vacuum channel 1112, inner seal 1114, outer vacuum channel 1116, and outer seal 1118.

In this example, these features are held and aligned by corresponding mirror image features for support tool 900 that are mirror images or symmetrical to features on inner surface 1106 of membrane 1102.

For example, membrane overlap 902 for support tool 900 is a mirror image of membrane overlap 1108 for membrane 1102. Resin dam 904 for support tool 900 is a mirror image of resin dam 1110 for membrane 1102, and inner vacuum channel 906 for support tool 900 is a mirror image of inner vacuum channel 1112 for membrane 1102. As another example, inner seal 908 for support tool 900 is a mirror image of inner seal 1114 for membrane 1102, and outer vacuum channel 910 for support tool 900 is a mirror image of outer vacuum channel 1116 for membrane 1102. Outer seal 912 for support tool 900 is a mirror image of outer seal 1118 for membrane 1102.

Thus, with mirror image features 901 for support tool 900 that correspond to features 1104 for membrane 1102, membrane 1102 can be held in place for alignment when, membrane 1102 is placed on support tool 900.

Figure 12:
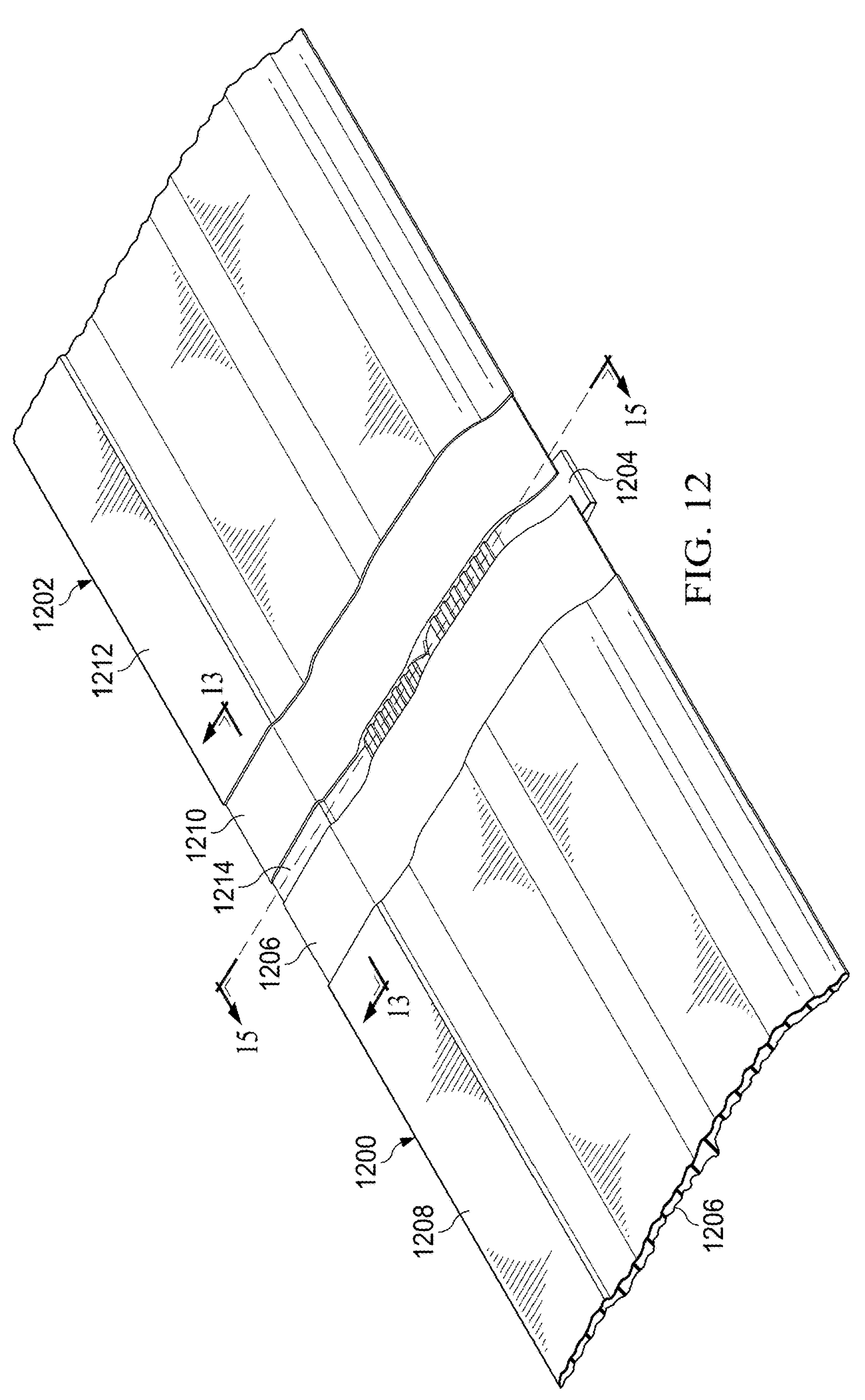
FIG. 12 is an illustration of a pair membranes on a support tool in accordance with an illustrative embodiment.

With reference to FIG. 12, an illustration of a pair membranes on a support tool is depicted in accordance with an illustrative embodiment. In this illustrative example, a pair of membranes, membrane 1200 and membrane 1202, located on support tool 1204. As depicted, membrane 1200 and membrane 1202 are examples of membranes 216 in FIG. 2, and support tool 1204 is an example of an implementation for support tool 310 in FIG. 3.

As depicted, membrane 1200 and membrane 1202 are each comprised of two layers. As depicted, membrane 1200 is comprised of silicon layer 1206 and fluoroelastomer layer 1208. Membrane 1202 is comprised of silicon layer 1210 and fluoroelastomer layer 1212. In this illustrative example, fluoroelastomer layer 1208 and fluoroelastomer layer 1212 can be used to reduce diffusion of nitrogen and increase compatibility with chromate or sealant tape.

The placement of membrane 1200 and membrane 1202 can be such that features for membrane 1200 and membrane 1202 mesh or fits with corresponding mirror image features on support tool 1204. These corresponding mirror image features are mirror images or symmetrical to features on membrane 1200 and membrane 1202.

As depicted, gap 1214 is present between membrane 1200 and membrane 1202. Gap 1214 is a location where a filler can be added to connect membrane 1200 and membrane 1202 together.

Figures 13, 14, 15:
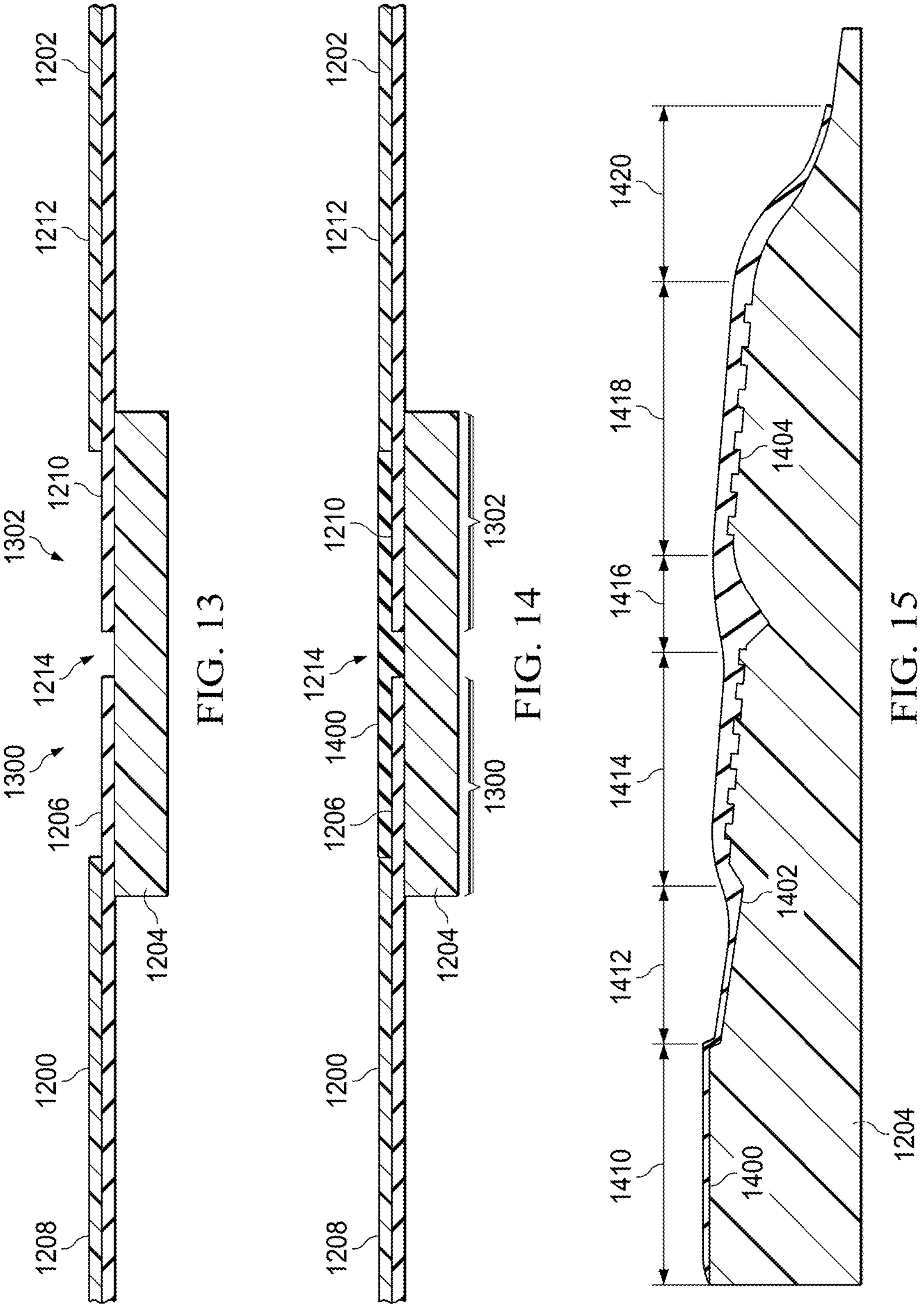
FIG. 13 is an illustration of a cross-sectional view of a pair of membranes on the support tool in accordance with an illustrative embodiment.
FIG. 14 is an illustration of a cross-sectional view of a pair of membranes on the support tool in accordance with an illustrative embodiment.
FIG. 15 is an illustration of a cross-sectional view of a filler on a support tool in accordance with an illustrative embodiment.

With reference to FIG. 13, an illustration of a cross-sectional view of a pair of membranes on the support tool is depicted in accordance with an illustrative embodiment. This cross-sectional view of membrane 1200 and membrane 1202 on support tool 1204 is taken along lines 13-13 in FIG. 12. As illustrated in this cross-sectional view, end 1300 of membrane 1200 is on support tool 1204. In a similar fashion, end 1302 of membrane 1202 is on support tool 1204.

Turning to FIG. 14, an illustration of a cross-sectional view of a pair of membranes on the support tool is depicted in accordance with an illustrative embodiment. This cross-sectional view, filler 1400 has been placed into gap 1214. In this illustrative example, filler 1400 is an example of an implementation for filler 302 shown in FIG. 3.

Filler 1400 can be cured to connect end 1300 of membrane 1200 and end 1302 of membrane 1202. This connection occurs to splice the two membranes to each other.

Turning next to FIG. 15, an illustration of a cross-sectional view of a filler on a support tool is depicted in accordance with an illustrative embodiment. In this figure, a cross-sectional view of support tool 1204 taken along lines 15-15 in FIG. 12 is depicted.

In this cross-sectional view, filler 1400 has been added and cured on support tool 1204. As illustrated, filler 1400 has features 1402 on inner surface 1404 of filler 1400.

These features are aligned with the features in membrane 1200 and membrane 1202. For example, filler 1400 has membrane overlap 1410, resin dam 1412, inner vacuum channel 1414, inner seal 1416, outer vacuum channel 1418, and outer seal 1420. These features connect to the corresponding features in membrane 1200 and membrane 1202. As depicted, support tool 1204 provides a mechanism for enabling the alignment and connection of corresponding features between filler 1400 and membrane 1200 and corresponding features between filler 1400 and membrane 1202.

Figure 16:
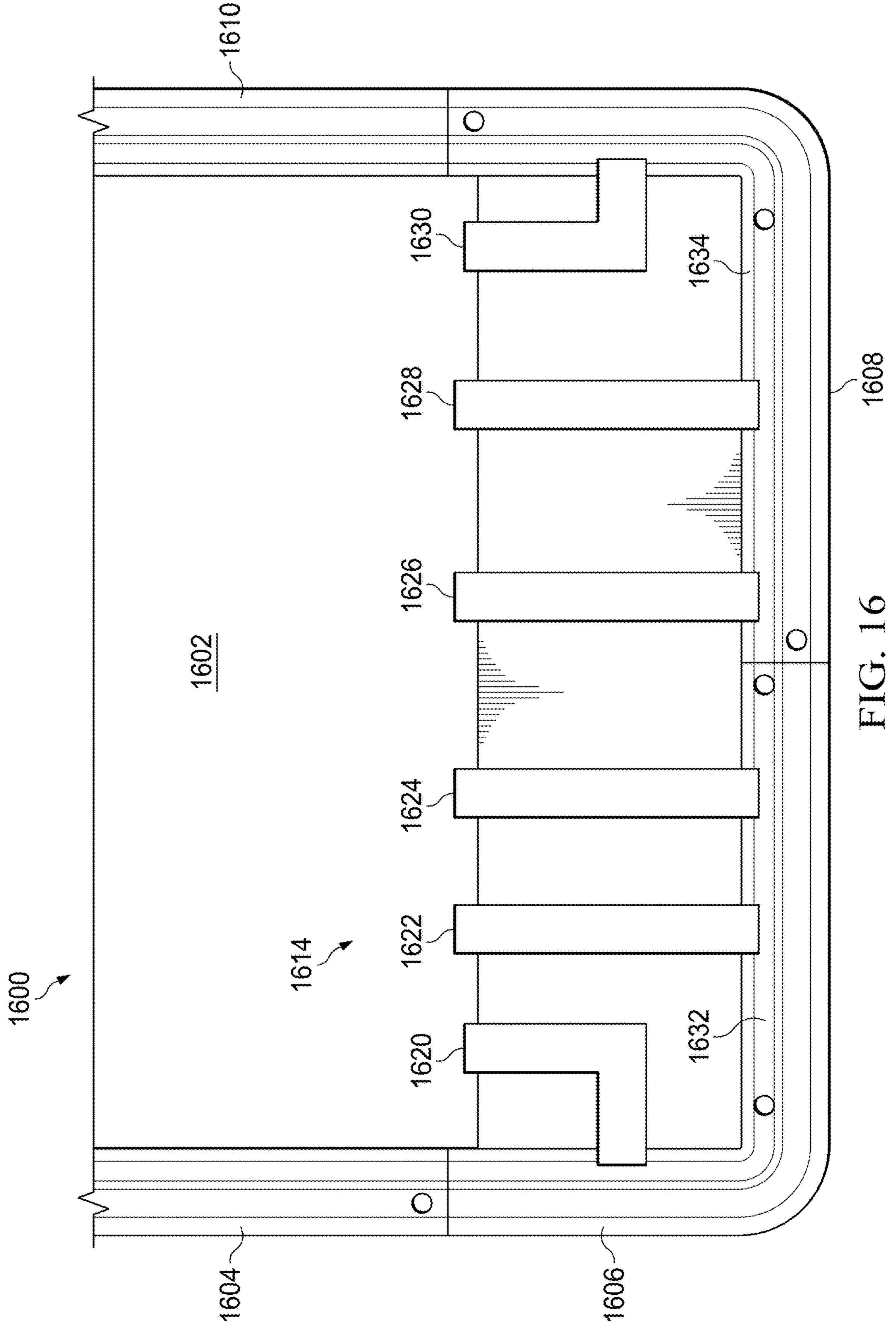
FIG. 16 an illustration of a top view of a portion of an integrated caul in accordance with an illustrative embodiment.

Turning next to FIG. 16, an illustration of a top view of a portion of an integrated caul is depicted in accordance with an illustrative embodiment. As depicted, integrated caul 1600 is comprised of caul 1602, membrane 1604, membrane 1606, membrane 1608, and membrane 1610. Membrane 1606 and membrane 1608 are corner membranes in membranes in integrated caul 1600.

In this illustrative example, membrane 1606 and membrane 1608 include breathing pathways 1614, which are an optional feature. Breathing pathways 1614 are comprised of path 1620, path 1622, path 1624, path 1626, path 1628, and path 1630. These paths are channels connected to inner vacuum channel 1632 extending through membrane 1604, membrane 1606, membrane 1608, and membrane 1610.

Breathing pathways 1614 locally bypass resin dam 1634 from an uncured composite structure (not shown) under caul 1602 to inner vacuum channel 1632. These breathing pathways enable the uncured composite structure to expel volatile gases during the curing process and can also prevent or reduce porosity in the composite structure after curing. These breathing channels can be implemented as structures formed in the membranes or by using strips of peel ply cloth under the membranes to define breathing pathways 1614.

Figure 17:
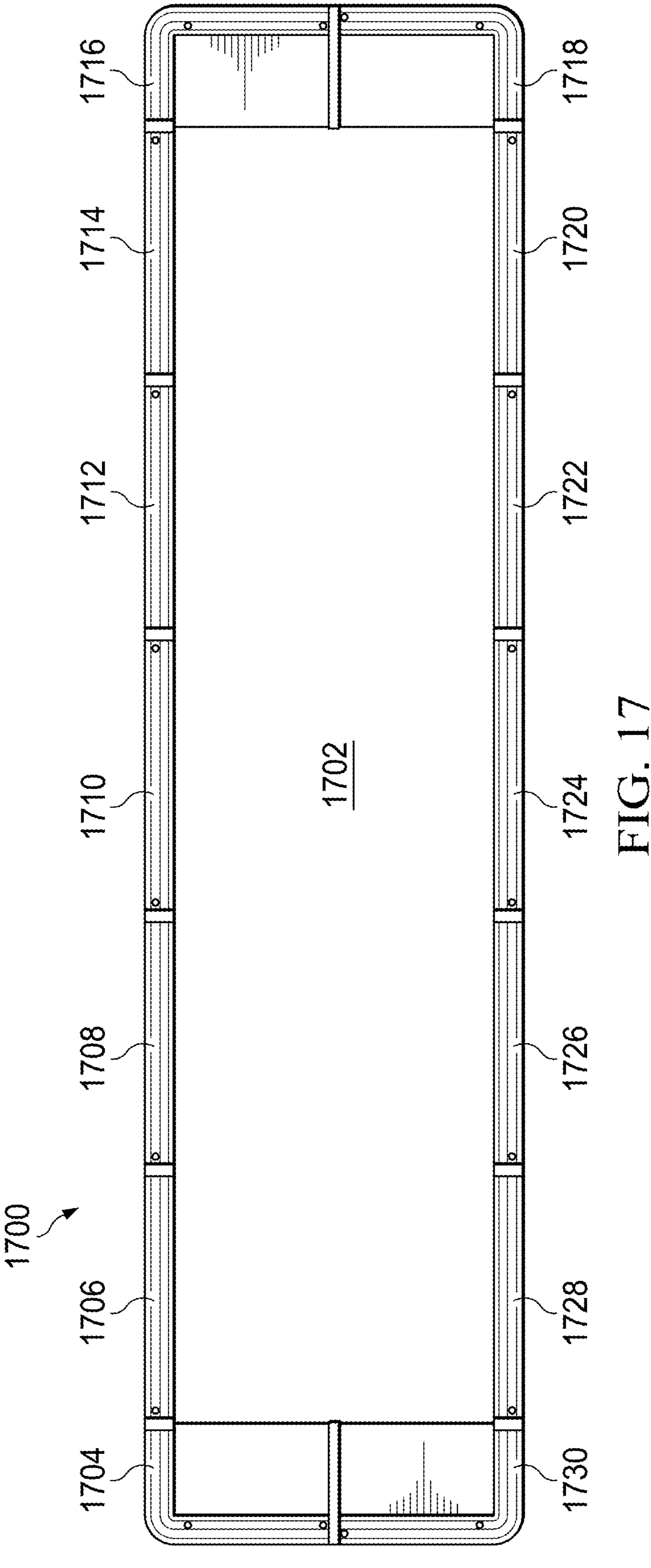
FIG. 17 is an illustration of an integrated caul in accordance with an illustrative embodiment.

Turning to FIG. 17, an illustration of an integrated caul is depicted in accordance with an illustrative embodiment. In this illustrative example, integrated caul 1700 is comprised of caul 1702, membrane 1704, membrane 1706, membrane 1708, membrane 1710, membrane 1712, membrane 1714, membrane 1716, membrane 1718, membrane 1720, membrane 1722, membrane 1724, membrane 1726, membrane 1728, and membrane 1730. As depicted, the membranes are bonded to caul 1702 and are spliced together.

Integrated caul 1700 can be placed on uncured composite structure. A vacuum can be drawn to apply pressure on the uncured composite structure during the curing process. Integrated caul 1700 can be reused without using consumables or a reduced amount of consumables as compared to current elastomeric bag and caul systems. Further, this configuration also reduces the amount of setup time needed for curing an uncured composite structure.

The illustration of integrated cauls, membranes, support tools, and the different components in FIGS. 5-17 are shown for purposes of illustrating example implementations and not meant to limit the manner in which other illustrative examples can be implemented. For example, an integrated caul can have shapes other than the rectangular shape shown in FIG. 17. For example, an integrated caul can have shapes selected from one of a rectangle, an oval, a circle, a pentagon, an irregular shape, or some other suitable shape. As another example, membranes can include extensions or features for the use of bladders with an integrated caul.

Figures 18, 19, 20, 21:
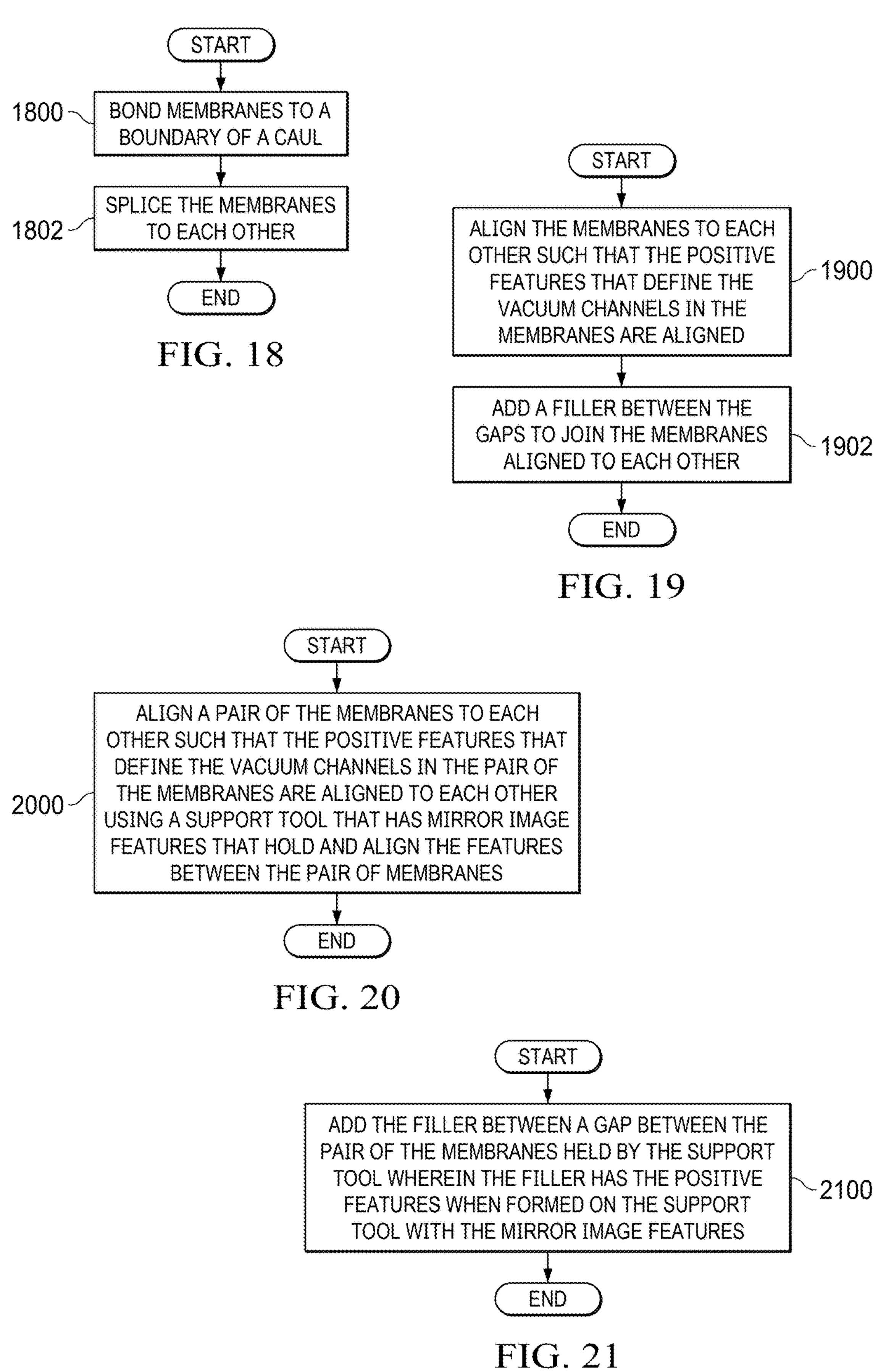
FIG. 18 is an illustration of a flowchart of a process for forming an integrated caul to apply a vacuum-based pressure on an uncured composite structure in accordance with an illustrative embodiment.
FIG. 19 is an illustration of a flowchart of process for splicing membranes in accordance with an illustrative embodiment.
FIG. 20 is an illustration of a flowchart of a process for aligning membranes to each other in accordance with an illustrative embodiment.
FIG. 21 is an illustration of a flowchart of a process for adding filler to a gap in accordance with an illustrative embodiment.

Turning next to FIG. 18, an illustration of a flowchart of a process for forming an integrated caul to apply a vacuum-based pressure on an uncured composite structure is depicted in accordance with an illustrative embodiment. The process in FIG. 18 can be implemented in hardware, software, or both to control manufacturing equipment to apply pressure on uncured composite structure. When implemented in software, the process can take the form of program code that is run by one of more processor units located in one or more hardware devices in one or more computer systems. One or more operations can also be performed by human operators in addition to or in place of a computer implemented process.

The process begins by bonding membranes to a boundary of a caul (operation 1800). In operation 1800, the membranes include positive features that define vacuum channels.

The process splices the membranes to each other (operation 1802). The process terminates thereafter. In operation 1802, the positive features that define the vacuum channels in the membranes are aligned to each other during splicing of the membranes. Also, the membranes spliced to each other and bonded to the caul form an integrated caul. The integrated caul applies a pressure on the uncured composite structure during operation of the integrated caul.

In FIG. 18, the operations are not necessarily performed in the order shown. For example, the membranes can be bonded to the caul prior to or after splicing the membranes to each other.

Turning next to FIG. 19, an illustration of a flowchart of process for splicing membranes is depicted in accordance with an illustrative embodiment. The process illustrated in FIG. 19 is an example of one implementation for operation 1802 in FIG. 18.

The process begins by aligning the membranes to each other such that the positive features that define the vacuum channels in the membranes are aligned (operation 1900). In this operation, gaps are present between the membranes aligned to each other.

The process adds a filler between the gaps to join the membranes aligned to each other (operation 1902). The process terminates thereafter. In operation 1902, the filler comprises the positive features and connects the vacuum channels in the membranes to each other. In other words, the filler also includes portions of the vacuum channels that connect to the vacuum channels in the membranes to form a continuous vacuum channel between membranes.

With reference to FIG. 20, an illustration of a flowchart of a process for aligning membranes to each other is depicted in accordance with an illustrative embodiment. The process illustrated in FIG. 20 is an example of an implementation for operation 1900 in FIG. 19.

The process aligns a pair of the membranes to each other such that the positive features that define the vacuum channels in the pair of the membranes are aligned to each other using a support tool that has mirror image features that hold and align the features between the pair of membranes (operation 2000). The process terminates thereafter. This process can be performed between pairs of membranes in the membranes for the integrated caul.

In FIG. 21, an illustration of a flowchart of a process for adding filler to a gap is depicted in accordance with an illustrative embodiment. The process illustrated in FIG. 21 is an example of an implementation for operation 1902 in FIG. 19.

The process adds the filler between a gap between the pair of the membranes held by the support tool wherein the filler has the positive features when formed on the support tool with the mirror image features (operation 2100). The process terminates thereafter.

Figure 22:
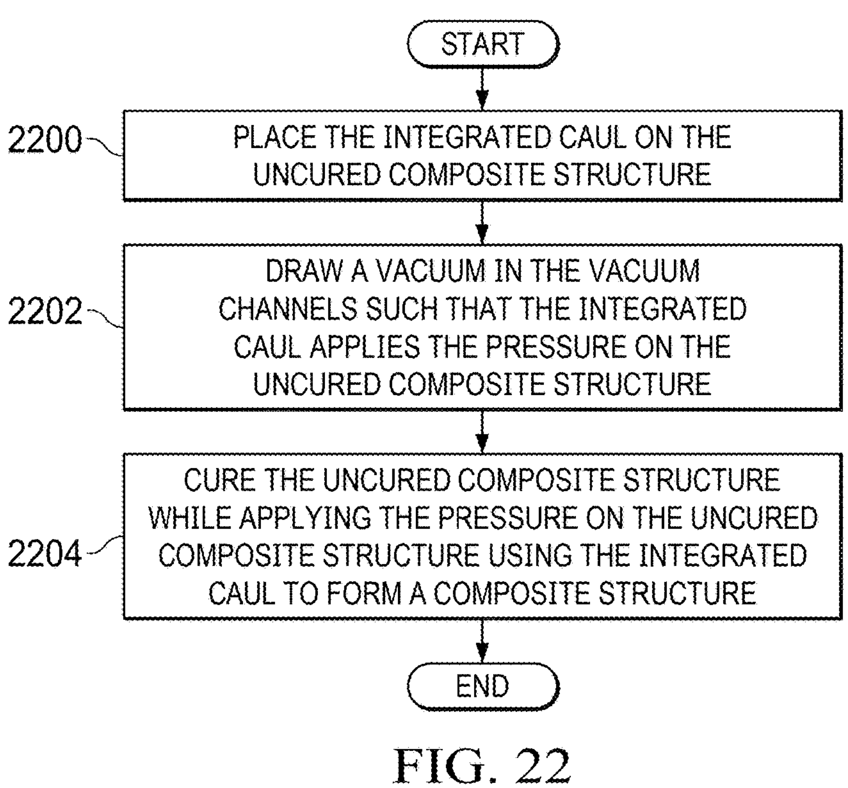
FIG. 22 is an illustration of a flowchart of a process for curing an uncured composite structure in accordance with an illustrative embodiment.

With reference to FIG. 22, an illustration of a flowchart of a process for curing an uncured composite structure is depicted in accordance with an illustrative embodiment. In this illustrative example, the process can cure uncured composite structure using vacuum pressure system 210 in FIG. 2.

The process begins by placing the integrated caul on the uncured composite structure (operation 2200). In operation 2200, the integrated caul comprises membranes bonded to a caul in which the membranes include positive features that define vacuum channels and a filler in gaps between the membranes in which the filler has the positive features that form part of the vacuum channels that are continuous around a boundary of the caul.

The process draws a vacuum in the vacuum channels such that the integrated caul applies the pressure on the uncured composite structure (operation 2202). The process cures the uncured composite structure while applying the pressure on the uncured composite structure using the integrated caul to form a composite structure (operation 2204). The process terminates thereafter.

Figure 23:
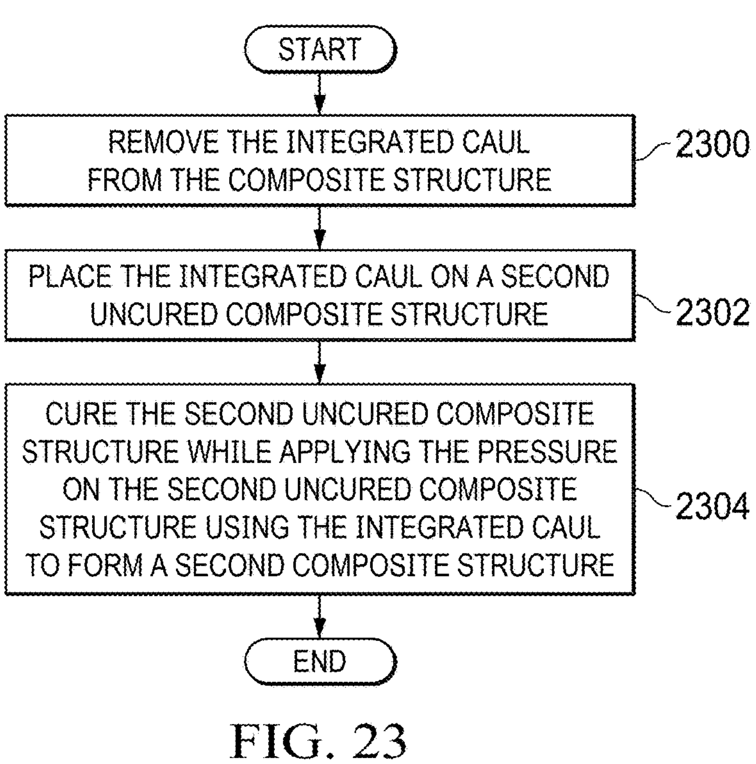
FIG. 23 is an illustration a flowchart of a process for reusing an integrated caul in accordance with an illustrative embodiment.

In FIG. 23, an illustration a flowchart of a process for reusing an integrated caul is depicted in accordance with an illustrative embodiment. In this illustrative example, the process reuses the integrated caul to cure another cure uncured composite structure.

The process begins by removing the integrated caul from the composite structure (operation 2300). In operation 2300, the process can reuse the integrated caul after curing an uncured composite structure to form the composite structure. This reuse can be performed without needing additional consumables such as an elastomeric vacuum bag. The process places the integrated caul on a second uncured composite structure (operation 2302).

The process cures the second uncured composite structure while applying the pressure on the second uncured composite structure using the integrated caul to form a second composite structure (operation 2304). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 24:
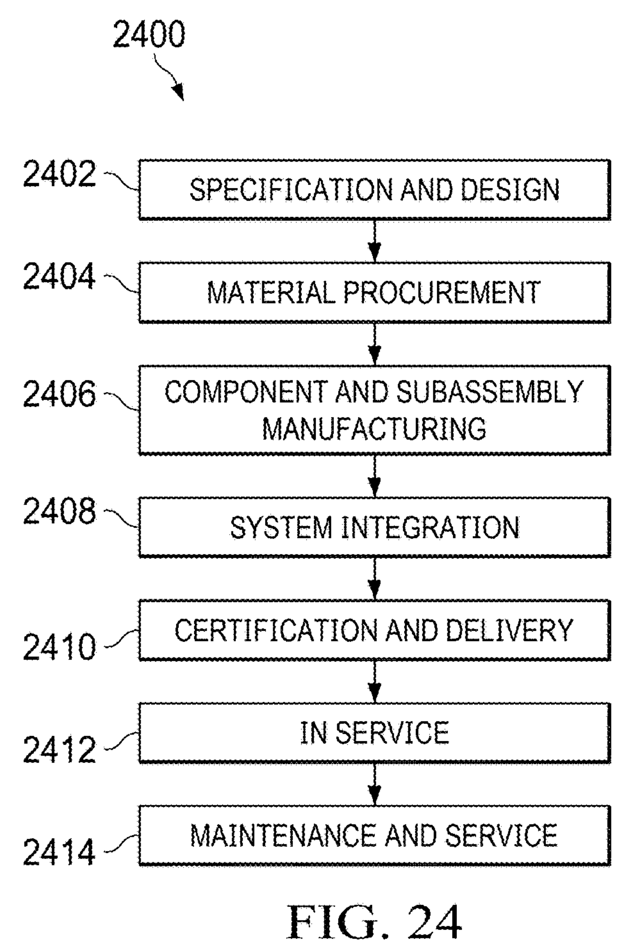
FIG. 24 is an illustration of an aircraft manufacturing and service method in accordance with an illustrative embodiment.
Figure 25:
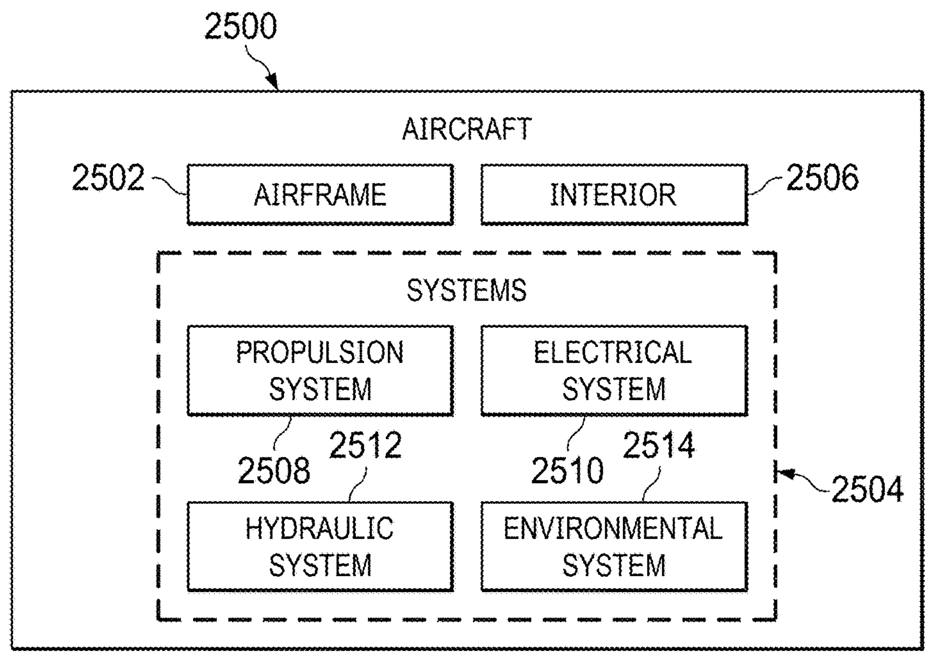
FIG. 25 is an illustration of a block diagram of an aircraft in which an illustrative embodiment may be implemented.

Illustrative embodiments of the disclosure may be described in the context of aircraft manufacturing and service method 2400 as shown in FIG. 24 and aircraft 2500 as shown in FIG. 25. Turning first to FIG. 24, an illustration of an aircraft manufacturing and service method is depicted in accordance with an illustrative embodiment. During pre-production, aircraft manufacturing and service method 2400 may include specification and design 2402 of aircraft 2500 in FIG. 25 and material procurement 2404.

During production, component and subassembly manufacturing 2406 and system integration 2408 of aircraft 2500 in FIG. 25 takes place. Thereafter, aircraft 2500 in FIG. 25 can go through certification and delivery 2410 in order to be placed in service 2412. While in service 2412 by a customer, aircraft 2500 in FIG. 25 is scheduled for routine maintenance and service 2414, which may include modification, reconfiguration, refurbishment, and other maintenance or service.

Each of the processes of aircraft manufacturing and service method 2400 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 25, an illustration of an aircraft is depicted in which an illustrative embodiment may be implemented. In this example, aircraft 2500 is produced by aircraft manufacturing and service method 2400 in FIG. 24 and may include airframe 2502 with plurality of systems 2504 and interior 2506. Examples of systems 2504 include one or more of propulsion system 2508, electrical system 2510, hydraulic system 2512, and environmental system 2514. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2400 in FIG. 24.

In one illustrative example, components or subassemblies produced in component and subassembly manufacturing 2406 in FIG. 24 can be fabricated or manufactured in a manner similar to components or subassemblies produced while aircraft 2500 is in service 2412 in FIG. 24. As yet another example, one or more apparatus embodiments, method embodiments, or a combination thereof can be utilized during production stages, such as component and subassembly manufacturing 2406 and system integration 2408 in FIG. 24. One or more apparatus embodiments, method embodiments, or a combination thereof may be utilized while aircraft 2500 is in service 2412, during maintenance and service 2414 in FIG. 24, or both. The use of a number of the different illustrative embodiments may substantially expedite the assembly of aircraft 2500, reduce the cost of aircraft 2500, or both expedite the assembly of aircraft 2500 and reduce the cost of aircraft 2500.

For example, with the use of integrated caul 212 as described in FIG. 2, the amount of time needed to manufacture composite structures during component and subassembly manufacturing 2406 can be reduced. With the use of an integrated caul, the time needed to install components such as an elastomeric bag, release film, sealant tape, edge breathers, and other components can be eliminated. Further, a reduction in costs can also occur through reducing the need for consumables such as an elastomeric bag, release film, sealant tape, edge breathers, and other components used in current elastomeric bag and caul systems.

Figure 26:
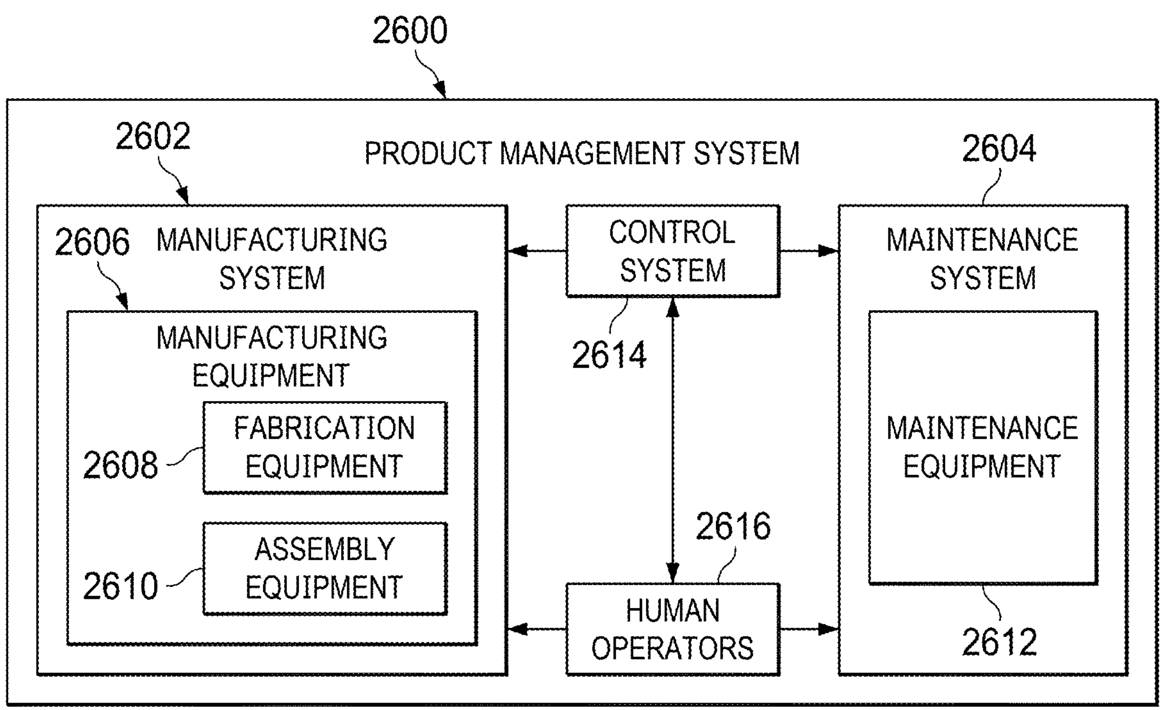
FIG. 26 is an illustration of a block diagram of a product management system in accordance with an illustrative embodiment.

Turning now to FIG. 26, an illustration of a block diagram of a product management system is depicted in accordance with an illustrative embodiment. Product management system 2600 is a physical hardware system. In this illustrative example, product management system 2600 includes at least one of manufacturing system 2602 or maintenance system 2604.

Manufacturing system 2602 is configured to manufacture products, such as aircraft 2500 in FIG. 25. As depicted, manufacturing system 2602 includes manufacturing equipment 2606. Manufacturing equipment 2606 includes at least one of fabrication equipment 2608 or assembly equipment 2610.

Fabrication equipment 2608 is equipment that used to fabricate components for parts used to form aircraft 2500 in FIG. 25. For example, fabrication equipment 2608 can include machines and tools. These machines and tools can be at least one of a drill, a hydraulic press, a furnace, an autoclave, a mold, a composite tape laying machine, an automated fibre placement (AFP) machine, a vacuum system, a robotic pick and place system, a flatbed cutting machine, a laser cutter, a computer numerical control (CNC) cutting machine, a lathe, or other suitable types of equipment. Fabrication equipment 2608 can be used to fabricate at least one of metal parts, composite parts, semiconductors, circuits, fasteners, ribs, skin panels, spars, antennas, or other suitable types of parts. In this illustrative example, fabrication equipment 2608 also includes vacuum pressure system 210 with integrated caul 212 in FIG. 2. Integrated caul 212 can be used in curing uncured composite to form composite structures for a product such as aircraft 2500.

Assembly equipment 2610 is equipment used to assemble parts to form aircraft 2500 in FIG. 25. In particular, assembly equipment 2610 is used to assemble components and parts to form aircraft 2500 in FIG. 25. Assembly equipment 2610 also can include machines and tools. These machines and tools may be at least one of a robotic arm, a crawler, a faster installation system, a rail-based drilling system, or a robot. Assembly equipment 2610 can be used to assemble parts such as seats, horizontal stabilizers, wings, engines, engine housings, landing gear systems, and other parts for aircraft 2500 in FIG. 25.

In this illustrative example, maintenance system 2604 includes maintenance equipment 2612. Maintenance equipment 2612 can include any equipment needed to perform maintenance on aircraft 2500 in FIG. 25. Maintenance equipment 2612 may include tools for performing different operations on parts on aircraft 2500 in FIG. 25. These operations can include at least one of disassembling parts, refurbishing parts, inspecting parts, reworking parts, manufacturing replacement parts, or other operations for performing maintenance on aircraft 2500 in FIG. 25. These operations can be for routine maintenance, inspections, upgrades, refurbishment, or other types of maintenance operations.

In the illustrative example, maintenance equipment 2612 may include ultrasonic inspection devices, x-ray imaging systems, vision systems, drills, crawlers, and other suitable devices. In some cases, maintenance equipment 2612 can include fabrication equipment 2608, assembly equipment 2610, or both to produce and assemble parts that needed for maintenance.

Product management system 2600 also includes control system 2614. Control system 2614 is a hardware system and may also include software or other types of components. Control system 2614 is configured to control the operation of at least one of manufacturing system 2602 or maintenance system 2604. In particular, control system 2614 can control the operation of at least one of fabrication equipment 2608, assembly equipment 2610, or maintenance equipment 2612.

The hardware in control system 2614 can be implemented using hardware that may include computers, circuits, networks, and other types of equipment. The control may take the form of direct control of manufacturing equipment 2606. For example, robots, computer-controlled machines, and other equipment can be controlled by control system 2614. In other illustrative examples, control system 2614 can manage operations performed by human operators 2616 in manufacturing or performing maintenance on aircraft 2500. For example, control system 2614 can assign tasks, provide instructions, display models, or perform other operations to manage operations performed by human operators 2616. In these illustrative examples.

In the different illustrative examples, human operators 2616 can operate or interact with at least one of manufacturing equipment 2606, maintenance equipment 2612, or control system 2614. This interaction can occur to manufacture aircraft 2500 in FIG. 25.

Of course, product management system 2600 may be configured to manage other products other than aircraft 2500 in FIG. 25. Although product management system 2600 has been described with respect to manufacturing in the aerospace industry, product management system 2600 can be configured to manage products for other industries. For example, product management system 2600 can be configured to manufacture products for the automotive industry as well as any other suitable industries.

Thus, the illustrative examples provide a method, apparatus, system for applying pressure on uncured composite structure as part of the curing process to manufacture a composite structure. The illustrative examples employ an integrated caul comprising a caul and membranes attached to the boundary of the caul. As depicted, these membranes are spliced together to each other such that corresponding features in the different membranes are aligned to each other.

The use of the integrated caul in the different examples can reduce the amount of time needed cure uncured composite structure to form a composite structure. For example, time needed to install components such as nylon bag, sealant tape, an edge breather, release film, flash breaker tape and other components are unnecessary or can be reduced. Further, the use of disposable or consumable components is reduced or avoided by using the integrated caul. Further, integrated caul is reusable to cure other uncured composite structures.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A vacuum pressure system that comprises an integrated caul that comprises: a caul; and membranes connected to a boundary of the caul, wherein: each membrane in the membranes comprises, respectively: a membrane overlap adjacent to a resin dam adjacent to an inner vacuum channel adjacent to an inner seal adjacent to an outer vacuum channel adjacent to an outer seal; the each membrane is connected to the caul along the each respective membrane overlap; and each membrane is separated, respectively, by a gap and connected, by a cured filler that fills the gap, to each adjacent membrane, wherein the cured filler comprises a shape that aligns with and continues from each membrane to each adjacent membrane: the membrane overlap adjacent to the resin dam adjacent to the inner vacuum channel adjacent to the inner seal adjacent to the outer vacuum channel adjacent to the outer seal.

2. The vacuum pressure system of claim 1, further comprising:

a vacuum source connected to a set of ports in the membranes, wherein the vacuum source is configured to draw a vacuum and cause the integrated caul to apply pressure on an uncured composite structure on which the integrated caul is placed.

3. The vacuum pressure system of claim 1, further comprising a bonding material that connects the membranes to the caul.

4. The vacuum pressure system of claim 3, wherein the bonding material is selected from at least one of an adhesive, a glue, or a resin.

5. The vacuum pressure system of claim 1, wherein an inner surface of at least one of the inner vacuum channels comprises ridges.

6. The vacuum pressure system of claim 1, wherein the membranes are comprised of at least one of silicon, a synthetic rubber and fluoropolymer elastomer, or a fluoroelastomer.

7. A tooling system for applying vacuum based pressure on uncured composite structures, wherein the tooling system comprises: a caul; membranes connected to a boundary of the caul wherein: each membrane in the membranes comprises, respectively: a membrane overlap adjacent to a resin dam adjacent to an inner vacuum channel adjacent to an inner seal adjacent to an outer vacuum channel adjacent to an outer seal; the each membrane is connected to the caul along the each respective membrane overlap; and each membrane is separated, respectively, by a gap and connected, by a cured filler that fills the gap, to each adjacent membrane, wherein the cured filler comprises a shape that aligns with and continues from each membrane to each adjacent membrane: the membrane overlap adjacent to the resin dam adjacent to the inner vacuum channel adjacent to the inner seal adjacent to the outer vacuum channel adjacent to the outer seal; positive features formed in the each inner vacuum channel, wherein the inner vacuum channel of adjacent membranes are aligned to each other such that the positive features are aligned; a set of ports in the membranes in communication with the each inner vacuum channel; and a vacuum source connected to the set of ports.

8. The tooling system of claim 7, wherein the cured filler comprises the positive features and connects the inner vacuum channels in the membranes to each other.

9. The tooling system of claim 7 further comprising:

a support tool comprising mirror image features to hold and align the positive features between a pair of the membranes.

10. The tooling system of claim 7, wherein a membrane at least one of the membranes comprises a silicon layer and a fluoroelastomer layer.

11. The tooling system of claim 7, wherein the inner vacuum channels comprise ridges.

12. The tooling system of claim 7, wherein one of the membranes comprises a corner membrane that comprises a and said inner channel of the corner membrane comprising a curved inner vacuum channel.

13. The tooling system of claim 7, wherein the membranes are connected to the caul by a bonding material.

14. The tooling system of claim 13, wherein the bonding material is selected from at least one of an adhesive, a glue, or a resin.

15. The tooling system of claim 7, wherein a width of the gap is determined by a connection of the adjacent membranes to the caul.

16. The tooling system of claim 7, wherein the gap comprises 0.3 to 0.4 inches.

17. A vacuum pressure system that comprises: an integrated caul; and a control system configured to control the following: placement of an integrated caul on an uncured composite structure, wherein the integrated caul comprises: membranes bonded to a boundary of a caul in which each of the membranes comprises, respectively: a membrane overlap adjacent to a resin dam adjacent to an inner vacuum channel adjacent to an inner seal adjacent to an outer vacuum channel adjacent to an outer seal; and each of the membranes is separated, respectively, by a gap and connected, by a cured filler that fills the gap, to each adjacent membrane, wherein the cured filler comprises a shape that aligns with and continues from each membrane to each adjacent membrane: the membrane overlap adjacent to the resin dam adjacent to the inner vacuum channel adjacent to the inner seal adjacent to the outer vacuum channel adjacent to the outer seal, wherein all vacuum channels are continuous around a boundary of the caul;

a vacuum connected to the vacuum channels such that the integrated caul applies a pressure on the uncured composite structure; and cure the uncured composite structure while applying the pressure on the uncured composite structure using the integrated caul to form a cured composite structure.

18. The vacuum pressure system of claim 17, wherein the outer vacuum channels comprise ridges.

19. The vacuum pressure system of claim 17, wherein comprise a corner membrane that comprises a curved inner vacuum channel a cross-section the membrane overlap, the resin dam, the inner vacuum channel, inner seal, outer vacuum channel, and outer seal wherein one of the membranes is a corner membrane, said inner channel of the corner membrane comprises a curved inner vacuum channel.

20. The vacuum pressure system of claim 17, wherein the membranes are bonded to the caul by a material selected from at least one of an adhesive, a glue, or a resin.

* * * * *